United States Patent
Kumar et al.

(10) Patent No.: US 10,528,327 B2
(45) Date of Patent: Jan. 7, 2020

(54) WORKFLOW DEVELOPMENT SYSTEM WITH EASE-OF-USE FEATURES

(71) Applicant: Microsoft Technology Licensing, LLC, Redmond, WA (US)

(72) Inventors: Prashant Kumar, Bellevue, WA (US); Jonjo Twist, Redmond, WA (US); Stephen C. Siciliano, Bellevue, WA (US); Himanshu Agrawal, Bellevue, WA (US); Prabir K. Shrestha, Redmond, WA (US); Balasubramanian Shyamsundar, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 15/188,407

(22) Filed: Jun. 21, 2016

(65) Prior Publication Data

US 2017/0147296 A1     May 25, 2017

Related U.S. Application Data

(60) Provisional application No. 62/258,851, filed on Nov. 23, 2015.

(51) Int. Cl.
*G06F 9/44*        (2018.01)
*G06F 8/20*        (2018.01)
(Continued)

(52) U.S. Cl.
CPC .................. *G06F 8/22* (2013.01); *G06F 8/10* (2013.01); *G06F 8/34* (2013.01); *G06F 8/36* (2013.01);
(Continued)

(58) Field of Classification Search
CPC .... G06F 8/10–36; G06F 3/048–04897; G06Q 10/0633
(Continued)

(56) References Cited

U.S. PATENT DOCUMENTS 6,624,908 B1 *   9/2003   Petchenkine .......... G06Q 10/06
                                                              358/1.15
7,065,493 B1 *   6/2006   Homsi ................... G06Q 10/06
                                                              705/7.26
(Continued)

FOREIGN PATENT DOCUMENTS

| EP | 1217515 A1 | 6/2002 |
| EP | 2388692 A1 | 11/2011 |
| WO | 02086704 A1 | 10/2002 |

OTHER PUBLICATIONS

"Model-Driven Development of GPU Applications"—Christoph Winter and Jan DU¨NNWEBER; Ostbayerische Technische Hochschule Regensburg, Germany. Sep. 2015.*
(Continued)

*Primary Examiner* — Francisco J Aponte
(74) *Attorney, Agent, or Firm* — Fiala & Weaver P.L.L.C.

(57) ABSTRACT

A workflow development system is described that provides a developer with a search utility for finding steps for inclusion in a workflow. The system also automatically generates a meaningful name and/or graphical representation for a workflow. The system also provides a graphical user interface that represents output parameters of a first workflow step as user-interactive objects. These objects can be interacted with to cause the objects to be inserted into a data entry element that is used to specify a value for an input parameter of a second workflow step. When executable logic representing the first and second workflow steps is generated, the insertion of the objects into the data entry element has the effect of causing the value of the input parameter of
(Continued)

the second workflow step to be defined to include the values of the output parameters that correspond to the inserted objects.

18 Claims, 18 Drawing Sheets

(51) Int. Cl.
*G06F 8/34* (2018.01)
*G06F 8/36* (2018.01)
*G06F 8/10* (2018.01)
*G06Q 10/06* (2012.01)

(52) U.S. Cl.
CPC ......... *G06Q 10/06* (2013.01); *G06Q 10/0633* (2013.01)

(58) Field of Classification Search
USPC .................................................. 717/104–121
See application file for complete search history.

(56) References Cited

U.S. PATENT DOCUMENTS

| | | | |
|---|---|---|---|
| 7,100,147 B2* | 8/2006 | Miller | G06Q 10/0633 705/7.27 |
| 7,184,801 B2* | 2/2007 | Farcasiu | G06Q 10/10 455/412.1 |
| 7,194,473 B1* | 3/2007 | Hichwa | H04L 67/02 |
| 7,373,310 B1* | 5/2008 | Homsi | G06Q 10/06 705/7.12 |
| 7,464,366 B2* | 12/2008 | Shukla | G06Q 10/06 705/7.27 |
| 7,739,325 B1* | 6/2010 | Okita | H04M 3/51 709/200 |
| 7,865,845 B2* | 1/2011 | Dettinger | G06F 3/0486 715/702 |
| 7,996,488 B1 | 8/2011 | Casabella et al. | |
| 8,082,169 B2* | 12/2011 | Crew | G06Q 10/06 705/7.26 |
| 8,103,536 B2 | 1/2012 | Green et al. | |
| 8,151,202 B1* | 4/2012 | Cronin | G06F 8/34 715/704 |
| 8,209,659 B2 | 6/2012 | Mathew | |
| 8,332,811 B2* | 12/2012 | Festa | G06Q 10/06 717/106 |
| 8,370,803 B1* | 2/2013 | Holler | G06F 8/36 717/101 |
| 8,468,492 B1* | 6/2013 | Frenkel | G06F 8/35 717/104 |
| 8,621,421 B2* | 12/2013 | Klaka | G06Q 10/06 717/101 |
| 8,751,284 B2* | 6/2014 | Goja | G06Q 10/06 705/7.27 |
| 8,762,186 B2 | 6/2014 | Freire et al. | |
| 8,862,975 B2 | 10/2014 | Liao et al. | |
| 8,972,872 B2* | 3/2015 | Labrou | G06F 8/00 715/744 |
| 9,557,988 B2* | 1/2017 | Binjrajka | G06F 8/71 |
| 9,646,080 B2 | 5/2017 | Audet et al. | |
| 9,766,927 B1* | 9/2017 | Islam | G06F 9/4843 |
| 9,851,955 B2* | 12/2017 | Childs | G06F 8/34 |
| 9,870,205 B1* | 1/2018 | Elliot | G06F 8/33 |
| 9,898,462 B2* | 2/2018 | Cope | G06Q 10/06 |
| 10,031,780 B2* | 7/2018 | Darji | G06F 9/546 |
| 2004/0078105 A1* | 4/2004 | Moon | G06Q 10/10 700/100 |
| 2005/0198021 A1 | 9/2005 | Wilcox et al. | |
| 2006/0053106 A1* | 3/2006 | Bhaghavan | G06Q 10/06 |
| 2006/0064674 A1* | 3/2006 | Olson, Jr. | G06F 8/34 717/113 |
| 2006/0069605 A1* | 3/2006 | Hatoun | G06Q 10/06 705/7.15 |
| 2006/0253830 A1* | 11/2006 | Rajanala | G06F 8/36 717/105 |
| 2007/0050227 A1 | 3/2007 | Teegan et al. | |
| 2007/0156485 A1 | 7/2007 | Sanabria et al. | |
| 2007/0157191 A1* | 7/2007 | Seeger | G06F 8/34 717/168 |
| 2008/0155479 A1* | 6/2008 | Long | G06F 9/4443 715/854 |
| 2008/0313573 A1 | 12/2008 | Nelson | |
| 2009/0006154 A1* | 1/2009 | Hao | G06Q 10/06 705/7.26 |
| 2009/0006997 A1* | 1/2009 | Jiang | G06Q 10/00 715/771 |
| 2009/0044185 A1* | 2/2009 | Krivopaltsev | H04L 29/06 717/173 |
| 2009/0119640 A1* | 5/2009 | Ramsey | G06F 8/34 717/109 |
| 2009/0204897 A1 | 8/2009 | Sogge et al. | |
| 2009/0293059 A1 | 11/2009 | Nathan et al. | |
| 2010/0106547 A1 | 4/2010 | Adi et al. | |
| 2010/0174974 A1* | 7/2010 | Brisebois | G06F 17/243 715/223 |
| 2010/0251155 A1* | 9/2010 | Shah | G06F 8/34 715/771 |
| 2010/0280865 A1* | 11/2010 | Goja | G06Q 10/06 705/7.27 |
| 2011/0185315 A1* | 7/2011 | Armour | G06F 8/34 715/853 |
| 2012/0079409 A1 | 3/2012 | Luo et al. | |
| 2013/0254698 A1* | 9/2013 | Schelling | G06Q 10/0633 715/772 |
| 2013/0332850 A1 | 12/2013 | Bovet et al. | |
| 2014/0074526 A1 | 3/2014 | Caudron | |
| 2014/0129550 A1* | 5/2014 | Weatherhead | G06F 17/30 707/723 |
| 2014/0149173 A1 | 5/2014 | Wood et al. | |
| 2014/0214495 A1* | 7/2014 | Kutty | G06Q 10/0637 705/7.36 |
| 2014/0229898 A1* | 8/2014 | Terwedo | G06F 3/04817 715/835 |
| 2014/0236663 A1* | 8/2014 | Smith | G06Q 10/0633 705/7.27 |
| 2014/0280475 A1 | 9/2014 | Chiussi et al. | |
| 2014/0350997 A1* | 11/2014 | Holm | G06Q 10/06316 705/7.26 |
| 2015/0100439 A1 | 4/2015 | Lu et al. | |
| 2015/0160809 A1 | 6/2015 | Mikheev | |
| 2015/0178052 A1 | 6/2015 | Gupta et al. | |
| 2015/0193498 A1* | 7/2015 | Weatherhead | G06F 17/30 707/722 |
| 2015/0193512 A1* | 7/2015 | No | G06F 17/30557 715/810 |
| 2015/0288682 A1* | 10/2015 | Bisroev | G06F 3/0481 713/172 |
| 2015/0355889 A1* | 12/2015 | Kilby | G06Q 10/06316 705/4 |
| 2016/0162539 A1* | 6/2016 | Yun | G06F 17/30398 707/771 |
| 2016/0188298 A1* | 6/2016 | Vandikas | G06Q 10/063 717/105 |
| 2016/0232491 A1* | 8/2016 | Nalsky | G06Q 10/103 |
| 2017/0132200 A1* | 5/2017 | Noland | G06F 17/248 |
| 2017/0147290 A1 | 5/2017 | Kumar et al. | |
| 2017/0315782 A1* | 11/2017 | Chaudhry | G06F 8/20 |

OTHER PUBLICATIONS

"International Search Report and Written Opinion Issued in PCT Application No. PCT/US2016/062122", dated Jun. 12, 2017, 16 Pages.

"TRACKVIA", Retrieved on: Aug. 4, 2015 Avaliable at: https:// www.trackvia.com/.

Ganesarajah, et al., "Workflow-Based Composition of Web-Services: a Business Model or a Programming Paradigm?", In Proceedings of the Sixth International Enterprise Distributed Object Computing Conference, Sep. 17, 2002, 12 pages.

(56) References Cited

OTHER PUBLICATIONS

Jing, et al., "WHAM: Supporting Mobile Workforce and Applications in Workflow Environments", In Proceedings of the Tenth International Workshop on Research Issues in Data Engineering, Feb. 27, 2002, 8 pages.
Nordin, Mattias, "IdeaExchange Idea Details", Retrieved on; Aug. 4, 2015 Avaliable at: https://success.salesforce.com/ideaView?id=08730000000gLUHAA2.
"Examples of Workflow Rules", Retrieved on: Aug. 4, 2015 Available at: https://help.salesforce.com/HTViewHelpDoc?id=workflow_examples.htm.
"ProcessMaker", Retrieved on: Aug. 4, 2015 Available at: https://play.google.com/store/apps/details?id=com.colosa.processmaker.
Boukhedouma, et al., "Interconnecting Workflows Using Services: An Approach for "Case Transfer" with Centralized Control", In Proceedings of Information Systems, Technology and Management Communications in Computer and Information Science, vol. 285, Mar. 28, 2012, pp. 396-401.
Francis, Kevin, "Workflow in Application Integration", Published on: Apr. 24, 2014 Available at: https://msdn.microsoft.com/en-us/library/bb245667.aspx.
"Getting Started", Retrieved on: Aug. 4, 2015 Available at: http://www.goodworkflows.com/#/tutorial.
"Secure, Cloud-Based Mobile Approval Workflows", Published on: Dec. 17, 2013 Available at: http://www.frevvo.com/e-forms-workflow.
"Creating Batch Workflow Applications", Retrieved on: Aug. 4, 2015 Available at: http://docs.oracle.com/cd/E41633_01/pt853pbh1/eng/pt/twfl/task_CreatingBatchWorkflowApplications-071674.html.
"Beyond 'Hello World': Creating role-based mobile workflow forms (tutorial)", Published on: Feb. 7, 2012 Available at: http://www.formotus.com/14623/blog-infopath/beyond-hello-world-creating-role-based-mobile-workflow-forms.
"Automating Workflows", Retrieved From: https://help.podio.com/hc/en-us/articles/201194467-Automating-workflows, Mar. 20, 2015, 3 Pages.
"Formotus", Retrieved From: https://www.formotus.com/blog/workflow-forms-and-sharepoint-dispatch, Dec. 21, 2015 3 Pages.
"Fujitsu RunMyProcess", Retrieved From: https://www.runmyprocess.com/platform/, Mar. 31, 2014, 8 Pages.
"Mobile Form App—How FastField Works!", Retrieved From: http://www.fastheldforms.com/features/how-it-works.html, Mar. 16, 2015, 6 Pages.
"Nintex", Retrieved From https://www.nintex.com/workflow-plafform/mobile#Collections-of-Forms-and-Workflow-Tasks, Apr. 14, 2015, 5 Pages.
"WorkfloPlus User Guide", Retrieved From: https://www.workfloplus.com/, Dec. 21, 2015, 31 Pages.
"Workflow Management Software-Comindware Tracker", Retrieved From https://www.comindware.com/workflow-software/, Dec. 21, 2015, 5 Pages.
"Non Final Office Action Issued in U.S. Appl. No. 15/232,575", dated Apr. 13, 2018, 14 Pages.
Brown, James, "How to Create a Workflow in VMware vRealize Orchestrator", Retrieved From: https://virtualizationreview.com/articles/2015/02/11/how-to-create-a-workflow-in-vrealize-orchestrator.aspx, Feb. 11, 2015, 6 Pages.
"International Search Report and Written Opinion Issued in PCT Application No. PCT/US2016/062126", dated Apr. 7, 2017, 11 Pages.
"Final Office Action Issued in U.S. Appl. No. 15/232,575", dated Sep. 11, 2018, 21 Pages.
"Notice of Allowance Issued in U.S. Appl. No. 15/232,575", dated Apr. 12, 2019, 10 Pages.
Zhang, et al., "Automatically Repairing Broken Workflows for Evolving GUI Applications", In Proceedings of 2013 International Symposium on Software Testing and Analysis, Jul. 15, 2013, pp. 45-55.

\* cited by examiner

WORKFLOW DEVELOPMENT SYSTEM WITH EASE-OF-USE FEATURES

CROSS-REFERENCE TO RELATED APPLICATIONS

This application claims the benefit of U.S. Provisional Patent Application No. 62/258,851, filed on Nov. 23, 2015, the entirety of which is incorporated by reference herein.

BACKGROUND

A business or enterprise application is a computer program used by business users to perform various business functions. Business applications are frequently developed when available off-the-shelf software does not completely address the desired functionality. Many business applications are interactive, having a graphical user interface (GUI) via which users can input data, submit data queries, perform operations, and view results. Consumer applications are less business focused, instead being focused on the needs of the consumer.

Business and consumer users tend to depend on information technology (IT) personnel to code their applications due to application complexity, and the programming expertise required. For example, merely designing an application to retrieve data from a remote source (e.g., a cloud service) is difficult, typically requiring the involvement of an experienced software developer.

Developing business and consumer applications is an activity that is typically performed on desktop computer systems having relatively large displays and a standard keyboard and mouse for accepting user input. Consequently, many tools for developing business and consumer applications do not include GUIs that are designed to efficiently use whatever screen space is available for displaying the GUI. Likewise, many tools for developing business and consumer applications do not include GUIs that take advantage of touch-based user input schemes or other techniques for reducing the amount of user interaction and user input required to develop such applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that provide a developer or other user with a search utility for finding operations that can be included in a workflow currently being developed. The search utility can also be used by a developer or other user to find workflow templates or complete workflows.

Methods, systems, apparatuses, and computer program products are also described herein that automatically generate a meaningful name and/or graphical representation (e.g., an icon) for a workflow. The name and/or graphical representation may be generated, for example, based on steps included in the workflow and/or on one or more services that are referenced by the workflow.

Methods, systems, apparatuses, and computer program products are also described herein that provide a GUI for a workflow development system. The GUI represents output parameters of a first workflow step of a workflow under development as user-interactive objects. These objects can be easily interacted with (e.g., clicked on or dragged and dropped) by a developer to cause the objects to be inserted into a data entry element that is used to specify a value for an input parameter of a second workflow step of the workflow under development. When executable logic representing the first and second workflow steps is generated, the insertion of the objects into the data entry element has the effect of causing the value of the input parameter of the second workflow step to be defined to include the values of the output parameters that correspond to the inserted objects.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
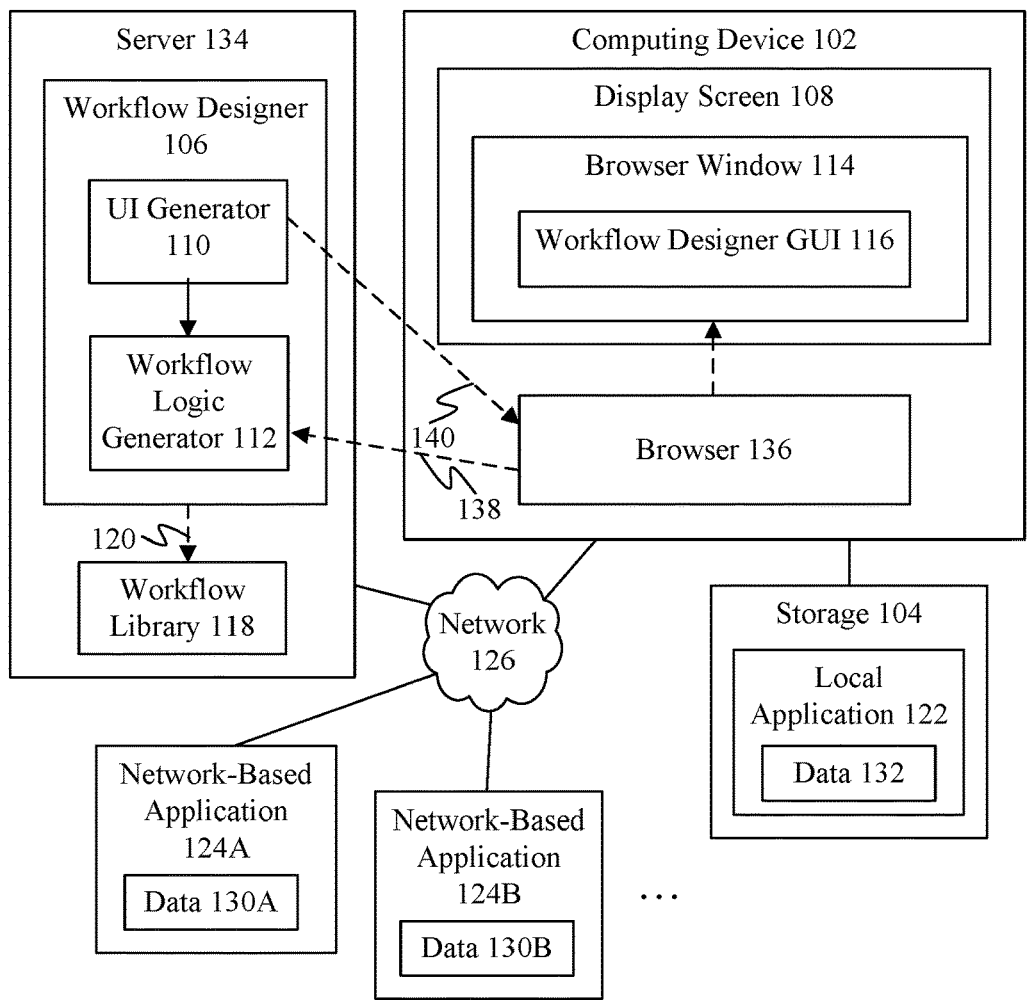
FIG. 1 is a block diagram of a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below will describe example embodiments for development of workflows. Sub-sections A and B of Section II describe example workflow development embodiments and runtime embodiments, respectively. Sub-sections C, D and E will describe ease of use features that can be implemented in a workflow development system. In particular, sub-section C of Section II describes example embodiments for workflow development that incorporate a search engine, sub-section D of Section II describes example embodiments for automatic generation of names and graphical representations of workflows, and sub-section E of Section II describes example embodiments for easily specifying input parameter values for a workflow step of a workflow under development. These ease of use features are useful on any platform, but may be particularly useful in mobile device embodiments where screen space is limited and providing user input may be difficult.

Section III below will describe an example mobile device that may be used to implement features of the embodiments described herein. Section IV below will describe an example processor-based computer system that may be used to implement features of the embodiments described herein. Section V below will describe some additional example embodiments. Section VI will provide some concluding remarks.

II. Example Embodiments for Development of Workflows

Business applications and consumer applications are typically created when available off-the-shelf software does not completely address the desired functionality. Many business and consumer applications are interactive, having a GUI via which users can input data, submit data queries, perform operations, and view results.

Users tend to depend on IT personnel to code their applications due to application complexity and the programming expertise required. For instance, configuring an application to retrieve data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments described herein enable easier development of applications, including business applications and consumer applications. Users are enabled to develop applications in the form of workflows without having to be expert programmers.

Example embodiments are described in the following subsections for development of applications in the form of workflows. In the following description, a person that develops an application using the techniques described herein is referred to as a "developer," to be distinguished from a person that uses the application at runtime (a "user" or "end user"). It is noted, however, that a "developer," as referred to herein, does not need to have any expertise in computer programming. Various embodiments described herein enable application development without special programming skills.

A. Example Workflow Development Embodiments

Development of workflows may be enabled in various ways in embodiments. For instance, FIG. 1 is a block diagram of a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Computing device 102 includes a display screen 108 and a browser 136. Storage 104 stores a local application 122. System 100 is described as follows.

Computing device 102 may be any type computing device, including a mobile computing device (e.g., a smart phone, a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows developed using workflow designer 106 when such workflows are executed at runtime. Local application 122 may be any type of local application or service, such as a database application (e.g., QuickBooks®, a Microsoft® Excel® spreadsheet), an e-mail application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, which in some instances may be referred to as "cloud" applications or services. Network-based applications 124A and 124B are accessible by computing device 102 over network 126, may be configured to perform data processing and/or data hosting operations, and may provide data 130A and 130B, respectively, to workflows created using workflow designer 106 when such workflows are executed at runtime. Network-based applications 124A and 124B may each be any type of network-accessible applications or services, such as database applications, social networking applications, messaging applications, financial services applications, news applications, search applications, productivity applications, cloud storage applications, file hosting applications, etc. Examples of such applications include a network-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, thousands, or greater numbers.

Note that data 130A, data 130B, and data 132 may each include any type of data, including messages, notifications, calculated data, retrieved data, structured data, unstructured data, and/or any other type of information requested or usable by a workflow.

Computing device 102 and server 134 may each include at least one wired or wireless network interface that enables communications with each other and with network-based applications 124A and 124B over network 126. Examples of such a network interface include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN) such as the Internet, a personal area network (PAN), and/or a combination of communication networks.

Workflow designer 106 is configured to be operated/interacted with to create applications in the form of workflows. For instance, a developer may access workflow designer 106 by interacting with an application at computing device 102 that is capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes a UI generator 110 and a workflow logic generator 112. UI generator 110 is configured to transmit workflow GUI information 140 (e.g., one or more web pages, image content, etc.) to browser 136 to be displayed as workflow designer GUI 116 within browser window 114 in display screen 108. Workflow designer GUI 116 may be interacted with by a developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked for execution by an end user.

During runtime execution of the workflow, workflow logic 120 may invoke operation of one or more local or network-based applications associated with the workflow steps of workflow logic 120. Each workflow step may receive input data. Such input data may include, for example, data 132 from local application 122, data 130A from network-based application 124A, data 130B from network-based application 124B, data from another application, and/or data from another workflow step of workflow logic 120.

Figure 2:
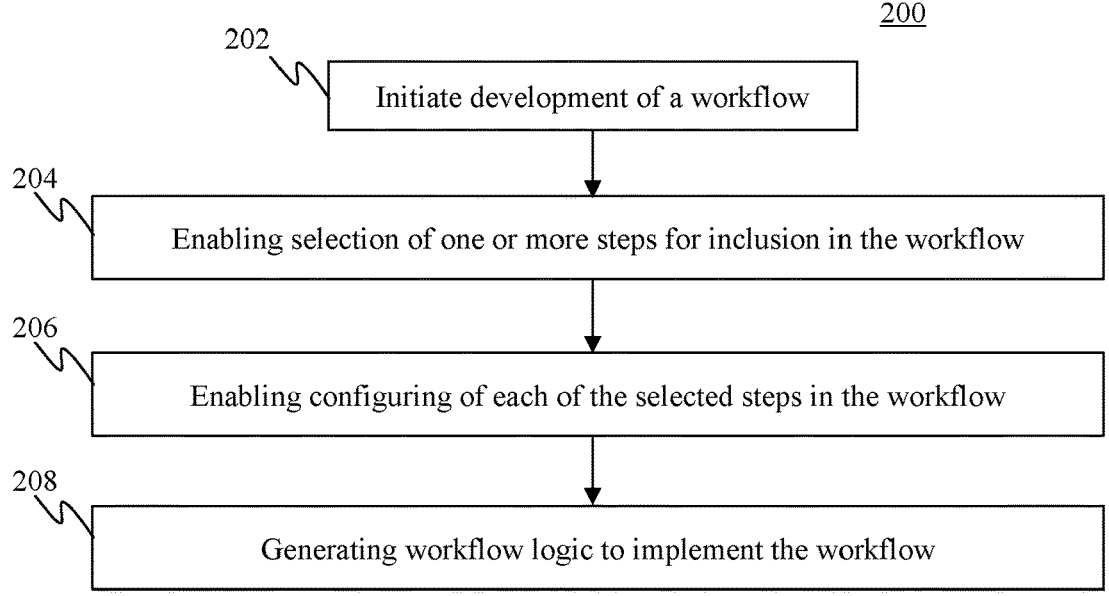
FIG. 2 depicts a flowchart of a process for development of workflows, according to an example embodiment.
Figure 3:
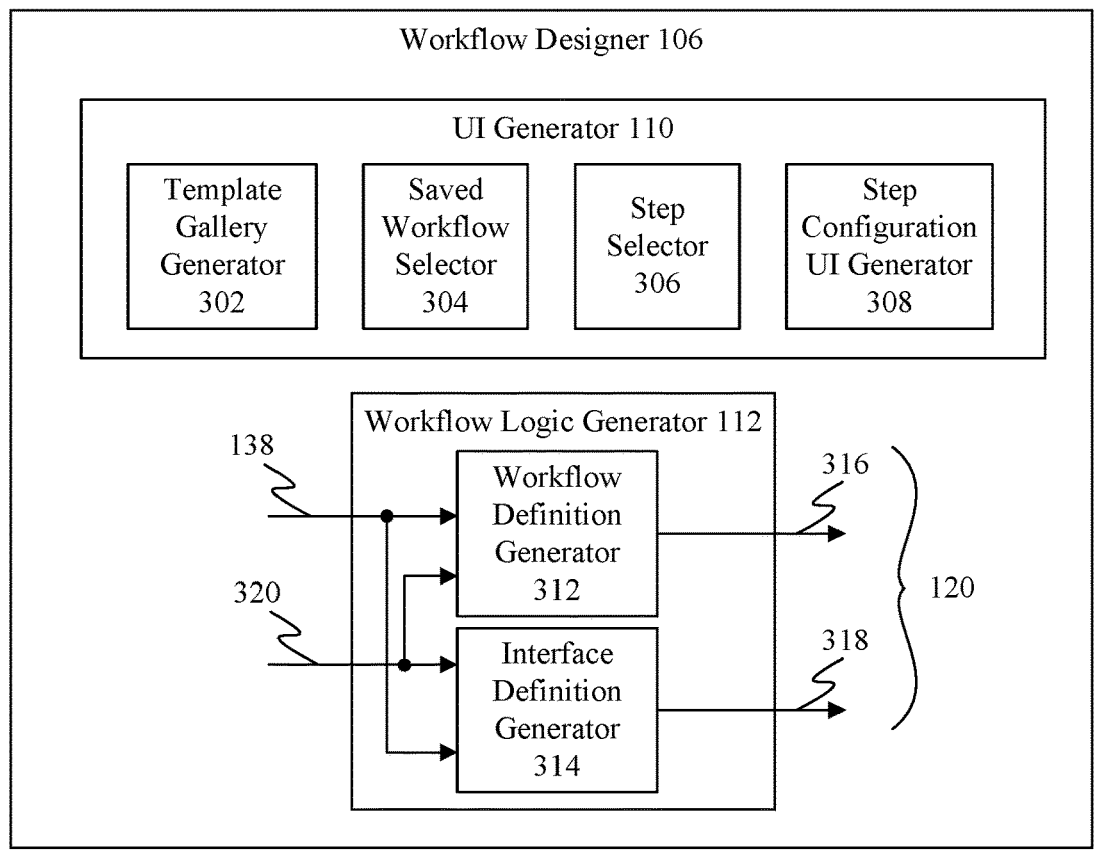
FIG. 3 is a block diagram of a workflow designer application, according to an example embodiment.
Figure 4:
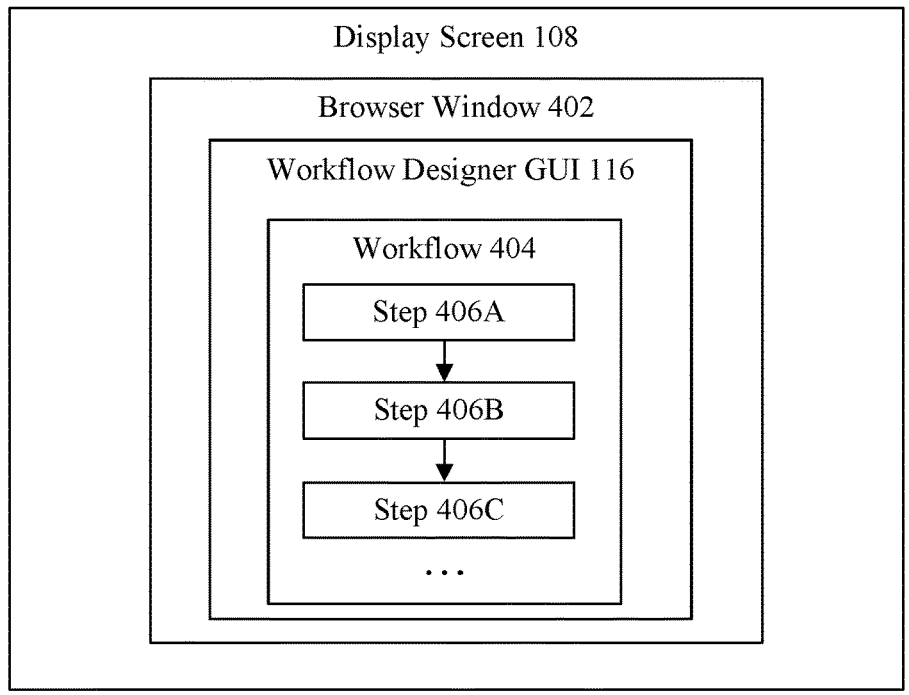
FIG. 4 is a block diagram of a display screen showing a browser window displaying an exemplary workflow, according to an example embodiment.

Workflow designer 106 may operate in various ways, to enable development of a workflow. For instance, in embodiments, workflow designer 106 may operate in accordance with flowchart 200 of FIG. 2. In particular, flowchart 200 depicts a process for development of workflows, according to an example embodiment. Flowchart 200 and workflow designer 106 are described as follows with respect to FIGS. 3 and 4. FIG. 3 is a block diagram of workflow designer 106, according to an example embodiment. As shown in FIG. 3, workflow designer 106 includes UI generator 110 and workflow logic generator 112. UI generator 110 includes a template gallery generator 302, a saved workflow selector 304, a step selector 306, and a step configuration UI generator 308. Workflow logic generator 112 includes a workflow definition generator 312 and an interface definition generator 314. FIG. 4 is a block diagram of display screen 108, illustrating an example of workflow designer GUI 116 displayed in browser window 402 on display screen 108, according to an example embodiment Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin developing a new workflow.

In one example, a displayed page of workflow designer GUI 116 may display a template gallery generated by template gallery generator 302. The template gallery may include a plurality of selectable workflow templates, each of which includes one or more pre-selected workflow steps that are suitable for further configuration by a developer. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, and step 406C may have been subsequently added (e.g., via selection from a menu or other list of workflow steps).

In another example, saved workflow selector 304 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, adding workflow steps, modifying workflow steps, removing workflow steps, or the like.

In yet another example, a displayed page of workflow designer GUI 116 may provide a blank window, area or canvas to which one or more developer-selected workflow steps may be added, ordered and configured. Such blank window, area or canvas may be generated by UI generator 110 automatically or in response to some developer input or interaction.

In step 204, selection of one or more steps for inclusion in the workflow is enabled. When a developer is editing a workflow, step selector 306 may enable the developer to select workflow steps for inclusion in the workflow, and to order the steps. The workflow steps may be accessed by step selector 306 in workflow library 118. For instance, step selector 306 may display a menu of workflow steps, a scrollable and/or searchable list of available workflow steps, or may provide the workflow steps in another manner, and may enable the developer to select any number of workflow steps from the list for inclusion in the workflow.

In one example, step selector 306 may enable a developer to select a step that is associated with a local application, such as Microsoft® Outlook®, or a network-based application, such as Facebook®. Step selector 306 enables the steps to be chained together in a sequence, optionally with conditional steps, for inclusion in workflow logic 120.

In step 206, each of the selected steps in the workflow is enabled to be configured. In an embodiment, step configuration UI generator 308 enables configuration of each workflow step in a workflow. Step configuration UI generator 308 accesses each selected workflow step in workflow library 118 to determine the configuration of the workflow step, including all of its input parameters and any other selections or information that a developer needs to provide to the workflow step to configure it. For example, step configuration UI generator 308 may generate a UI that enables the developer to type, navigate to, use a pull-down menu, or otherwise enter input data into a text input box or other data entry element to configure (e.g., specify an input parameter of) a workflow step. The developer may configure an output parameter of a prior step to be input data for a workflow step. Step configuration UI generator 208 may enable data or other objects to be copied and pasted, dragged and dropped, or otherwise entered from elsewhere into data entry elements of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the inputs and outputs (parameters) of the workflow step, such that a service may be accessed according to the API definition. In such an implementation, the operations in the workflow definition information 316 refer to the corresponding API metadata in the interface definition information 318 to provide a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 show views of an exemplary workflow in various phases of development using a workflow designer GUI, according to example embodiments. For example, each of FIGS. 5-8 shows browser window 402 displaying a corresponding view of workflow designer GUI 116 being used to develop a workflow.

Figure 5:
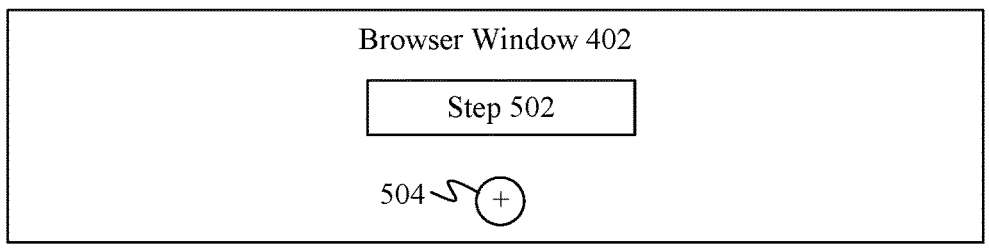
FIGS. 5-8 show views of an exemplary workflow in various phases of development using a workflow designer GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft® Outlook®). Each workflow step is configured to be plugged into the workflow. Each workflow step is configured with the appropriate logic and/or interface(s) to perform its respective function(s), which may include communicating with a local or remote application. For instance, a workflow step for transmitting a query to an application (e.g., a search query to a search engine, a database query to a database, a request for data from a social networking application, etc.) may be pre-configured in terms of how to properly transmit and format such a request to the application. As another example, a workflow step for receiving a response to a request may be pre-configured in terms of how to parse the response for desired response data. As such, a developer of a workflow does not need to know how to write program code in a programming language, to interface with complex application interfaces (e.g., application programming interfaces (APIs)), or to understand network communication protocols, as the workflow steps are already set up. When a workflow step is plugged into workflow logic by a developer, the developer configures the inputs to the workflow step (as described below), and the pre-configured workflow step handles any communications with other applications.

Figure 6:
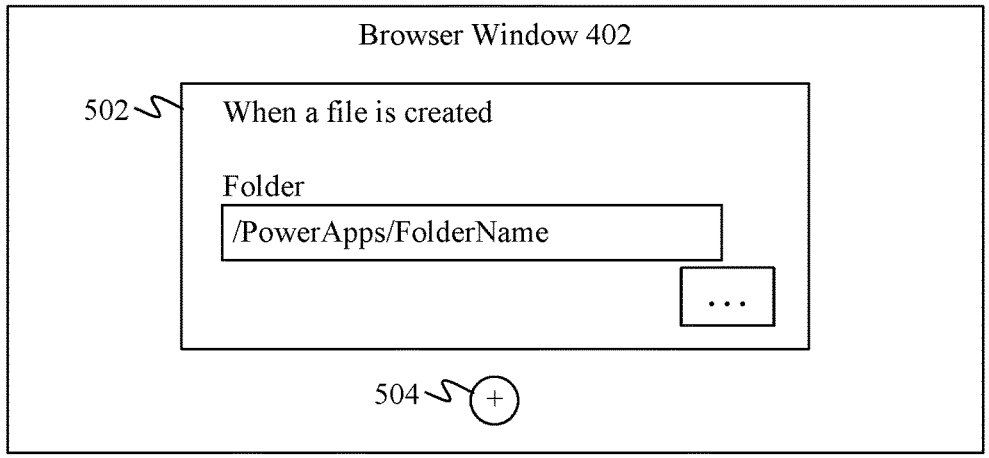

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to perform monitoring to determine if a file has been created in a particular folder identified by the developer in a text input box (e.g., by typing, clicking on a navigator indicated by " . . . ", etc.). When workflow step 502 determines that a file has been added to the indicated folder, a workflow step following workflow step 502 is triggered. Thus, workflow step 502 may be considered a trigger step in this example.

Figure 7:
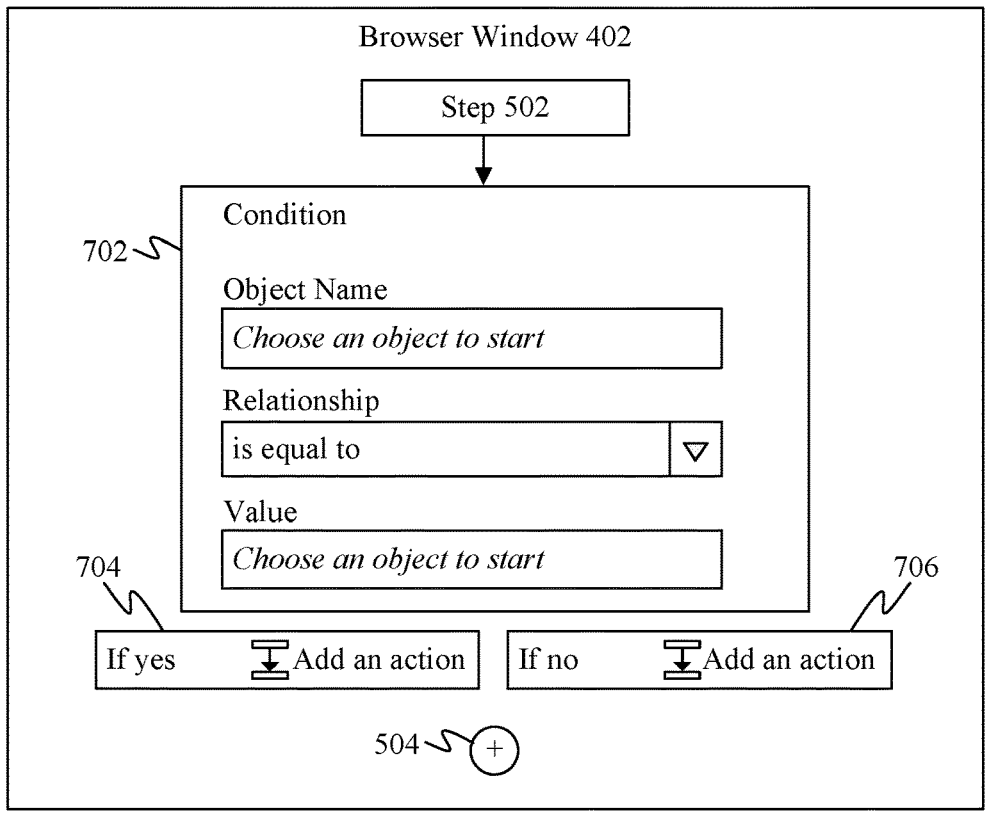

For instance, in FIG. 7, the developer interacted with add interface 504 to facilitate the selection of a next workflow step 702. For instance, in an embodiment, interaction with add interface 502 invokes step selector 306 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

For instance, in one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
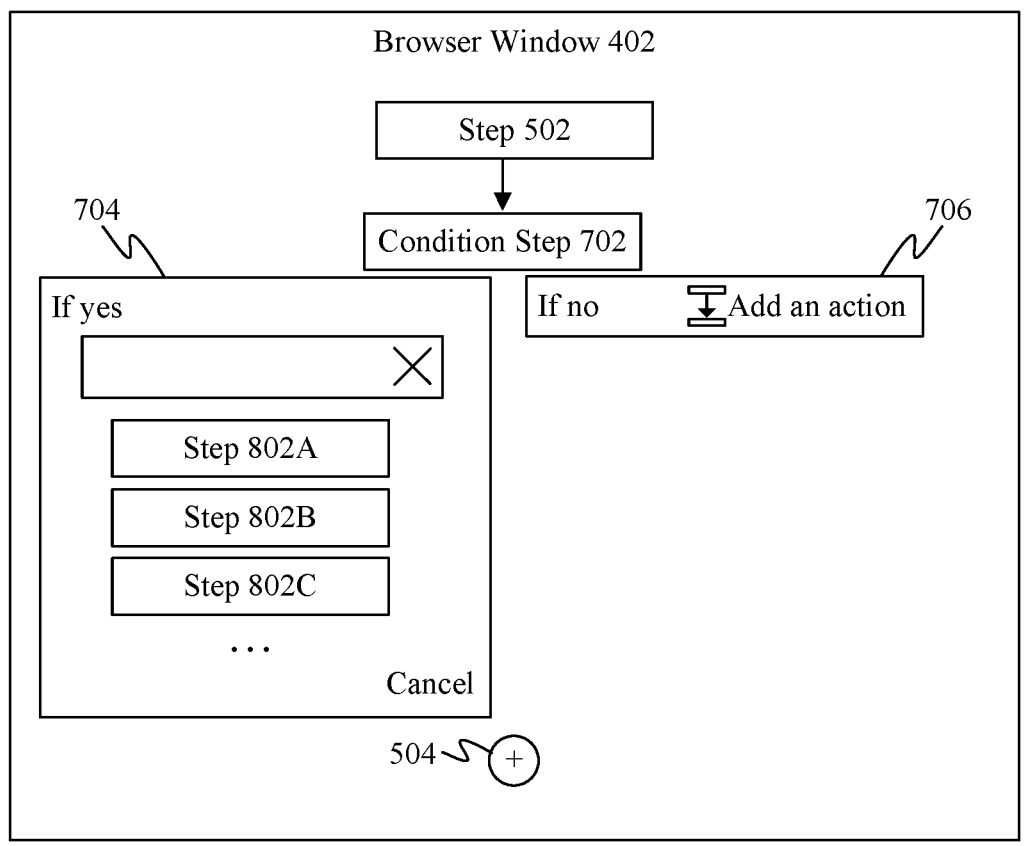

For example, in FIG. 8, the developer interacts with action workflow step 704 to define an action. In this example, the developer is defining action workflow step 704 by selecting a workflow step via step selector 306. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more local or network-accessible applications as was configured by the developer. Accordingly, the workflow performs its intended functions.

Figure 9:
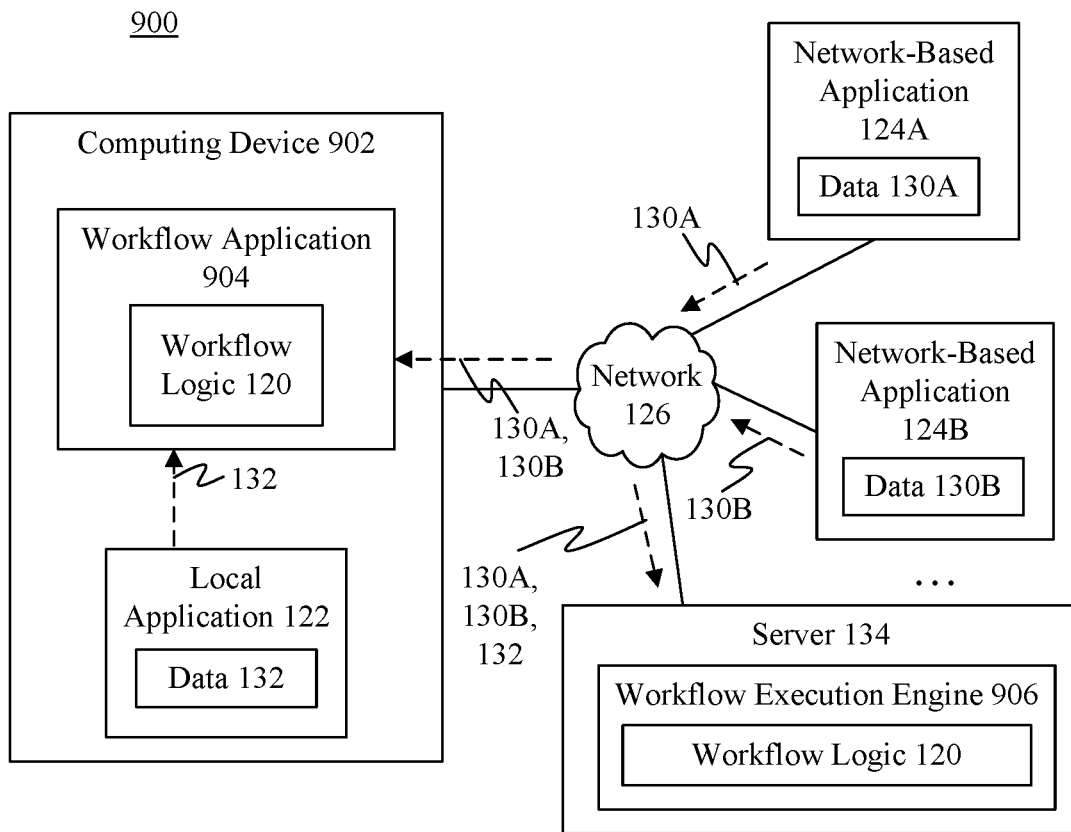
FIG. 9 is a block diagram of a system for executing a workflow, according to an example embodiment.

FIG. 9 is a block diagram of a system 900 for executing a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 900 is described as follows.

First and second network-based applications 124A and 124B are each optionally present, and whether or not such applications are communicated with will depend on the configuration of workflow logic 120. Further network-based applications may be present and communicated with, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 120 for a selected workflow (e.g., selected from a workflow library by a user), and may execute workflow logic 120 to execute the workflow.

In another embodiment, workflow application 904 may be configured to execute workflows at computing device 902. For instance, an end user of computing device 902 may interact with a user interface of workflow application 904 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may execute in workflow application 904 at computing device 902 and a second portion of workflow logic 120 may execute in workflow execution engine 906 at server 134 and/or elsewhere.

Figure 10:
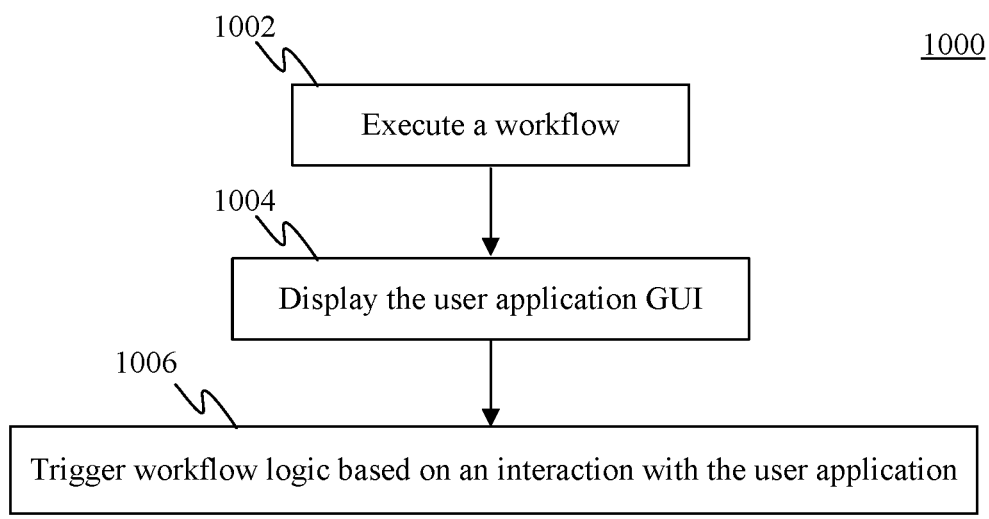
FIG. 10 depicts a flowchart of a process for executing a user application that includes one or more workflows, according to an example embodiment.

FIG. 10 depicts a flowchart 1000 of a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other local or network-based applications.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

C. Example Embodiments for Workflow Development that Incorporate a Search Engine As discussed above, in certain embodiments, step selector 306 of UI generator 110 may be invoked to present a developer with a list of steps, each of which may be selected for insertion into a workflow under development. In an embodiment that will now be described, step selector 306 is configured to provide the developer with a means for interacting with a search engine that can be used to identify workflow steps of interest to the developer. This enables the developer to quickly find useful and suitable workflow steps for developing her workflow. Furthermore, in embodiments, step selector 306 may be configured to provide a developer with access to this functionality within the context of a workflow designer GUI that concurrently displays a representation of the workflow currently being developed. Consequently, a developer can identify relevant workflow steps precisely when she needs them and without having to navigate away from the workflow representation.

Figure 11:
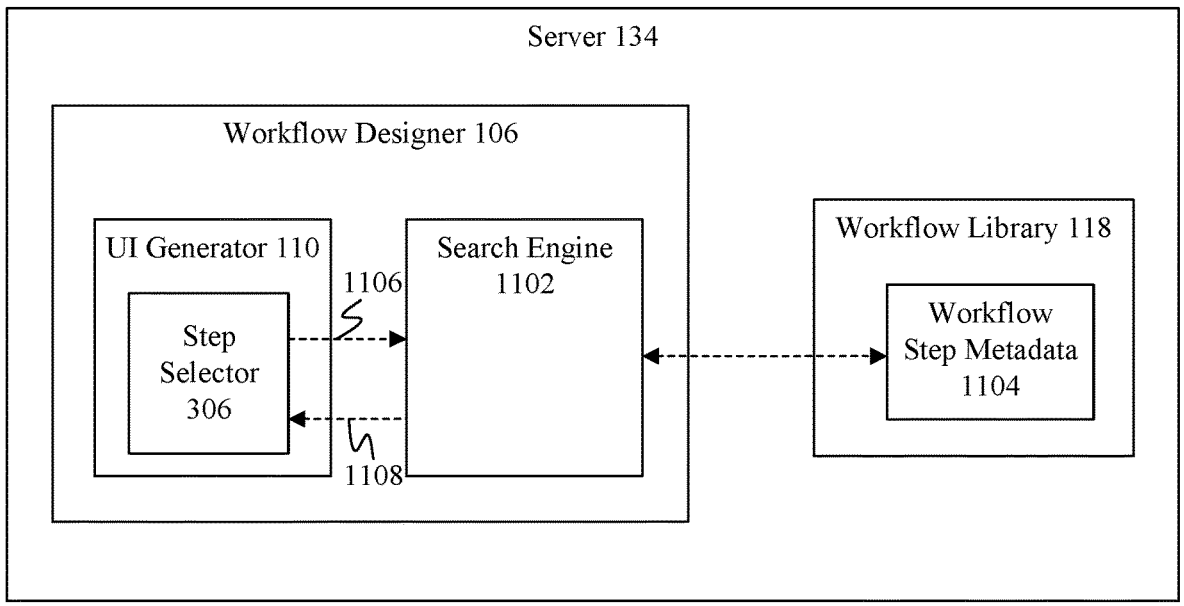
FIG. 11 is a block diagram of a workflow designer that incorporates a search engine and that utilizes the same to present a developer with a set of workflow steps for insertion into a workflow under development.

FIG. 11 is a block diagram of server 134 that includes workflow designer 106 and workflow library 118 (as previously discussed above in reference to FIG. 1). As shown in FIG. 11, workflow designer 106 also includes a search engine 1102. As will be discussed below in reference to FIG. 12, workflow designer 106 utilizes search engine 1102 to present a developer with a set of workflow steps for insertion into a workflow under development.

Figure 12:
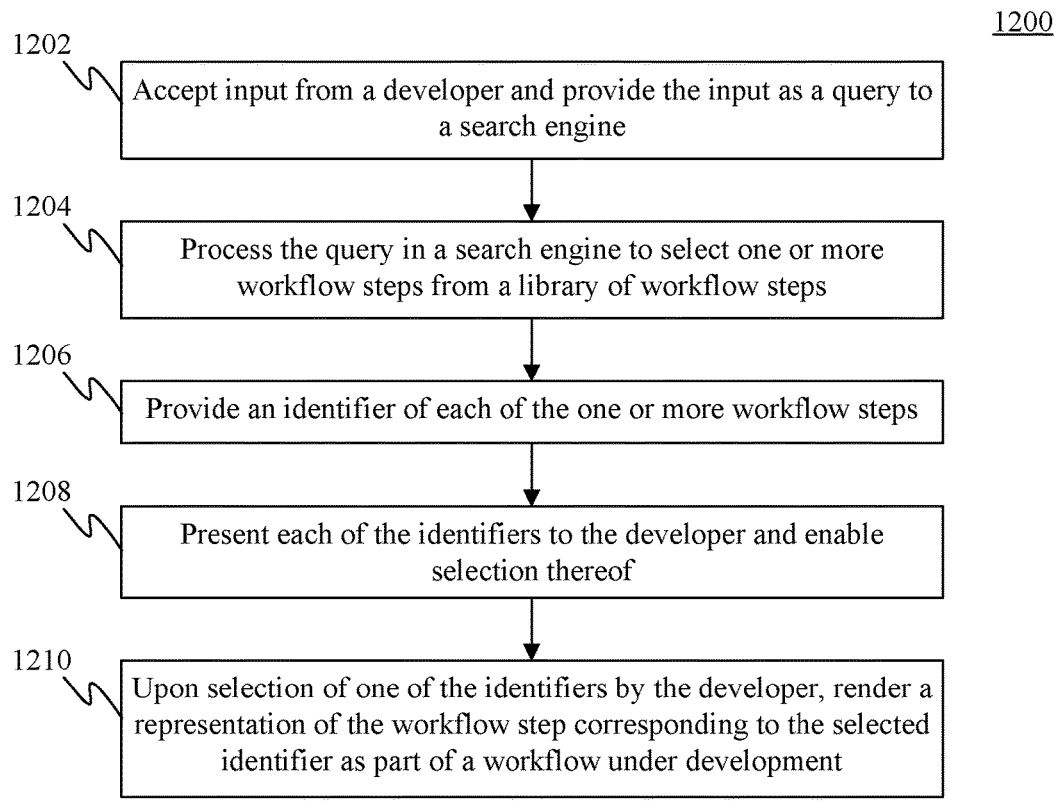
FIG. 12 depicts a flowchart of a method performed by a workflow designer for searching for and presenting a developer with a set of workflow steps for insertion into a workflow under development.

In particular, FIG. 12 depicts a flowchart 1200 of a method performed by workflow designer 106 for searching for and presenting a developer with a set of workflow steps for insertion into a workflow under development. As shown in FIG. 12, the method of flowchart 1200 begins at step 1202, in which input is accepted from a developer and is passed as a query to a search engine. This step may be performed, for example, by step selector 306, which receives input from a developer (e.g., text input by a developer) and passes the input as a query 1106 to search engine 1102. For example, step selector 306 may provide a data entry element (e.g. a text input box) or other interactive GUI component via which a user can provide input. Step selector 306 may present the data entry element within a workflow designer GUI that displays a representation of the workflow currently being developed.

At step 1204, the query is processed in a search engine to select one or more workflow steps from a library of workflow steps. This step may be performed, for example, by search engine 1102 which receives query 1106 and processes it to select one or more workflow steps from workflow library 118. In an embodiment, search engine 1102 selects the workflow step(s) by analyzing workflow step metadata 1104 associated with each of the workflow steps stored in workflow library 118 to identify workflow steps that are relevant to query 1106.

Workflow step metadata 1104 may include any type of structured or unstructured data concerning a workflow step. For example, such metadata may include a name or other identifier of the workflow step, a description of the workflow step, an identifier and/or description of a service that is utilized or referenced by the workflow step (e.g., Dropbox™, Facebook®, Outlook®, or the like), a description and/or identifier of a trigger monitored for by the workflow step, or a description and/or identifier of an action performed by the workflow step. The metadata may include multiple terms that can be used to describe the same step, service, trigger, or action so as to enable matching against a diverse array of developer queries.

In one embodiment, search engine 1102 comprises a natural language search engine that is configured to use natural language processing to interpret queries expressed using normal terms in a user's language, without any special syntax or format. For example, a natural language query may be expressed as a statement or a question. Such a natural language search engine may be capable of determining a user's intent based on the content of the query and provide highly-relevant workflow step suggestions. Of course, this example is not intended to be limiting, and search engine 1102 may be configured to perform keyword searching, semantic searching, or any other type of searching known to persons skilled in the relevant art(s).

At step 1206, the search engine provides an identifier of each of the workflow steps selected during step 1204. This step may be performed, for example, by search engine 1102, which provides workflow step identifiers 1108 to step selector 306. In one embodiment, the identifiers comprise names of the selected workflow steps.

At step 1208, each of the identifiers provided during step 1206 is presented to the developer and the developer is enabled to select any one of them. This step may entail, for example, step selector 306 presenting the identifiers to the developer in a menu that is displayed within a workflow designer GUI that displays a representation of the workflow currently being developed. The developer may be enabled to navigate or scroll up and down the menu to highlight and select a particular workflow step.

At step 1210, upon selection of one of the identifiers by the developer, a representation of the workflow step corresponding to the selected identifier is rendered as part of a workflow under development that is currently being displayed in the workflow designer GUI. This step may be performed, for example, by step selector 306, when the developer selects a particular workflow step identifier from the aforementioned menu.

Figure 14:
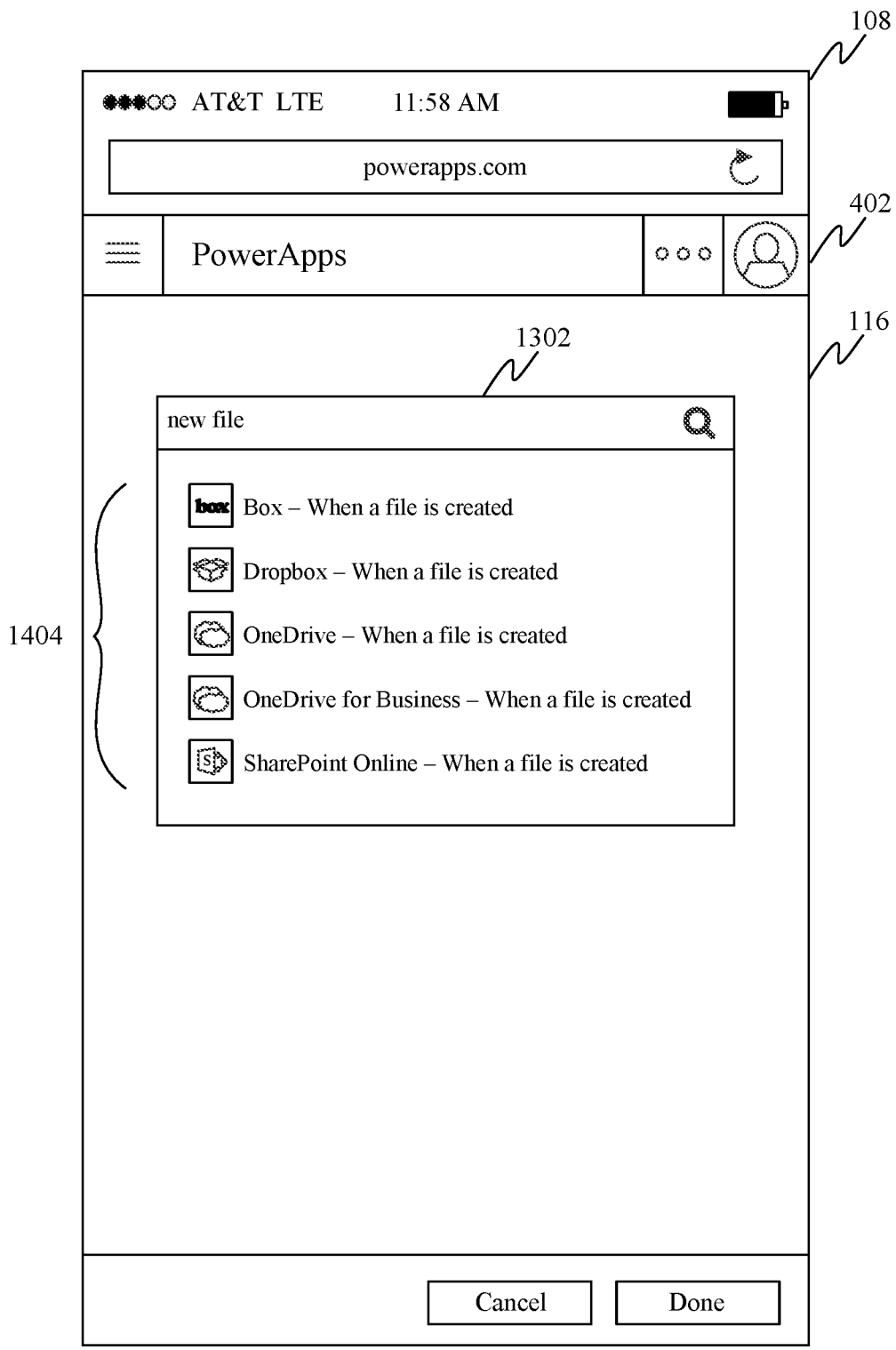
Figure 15:
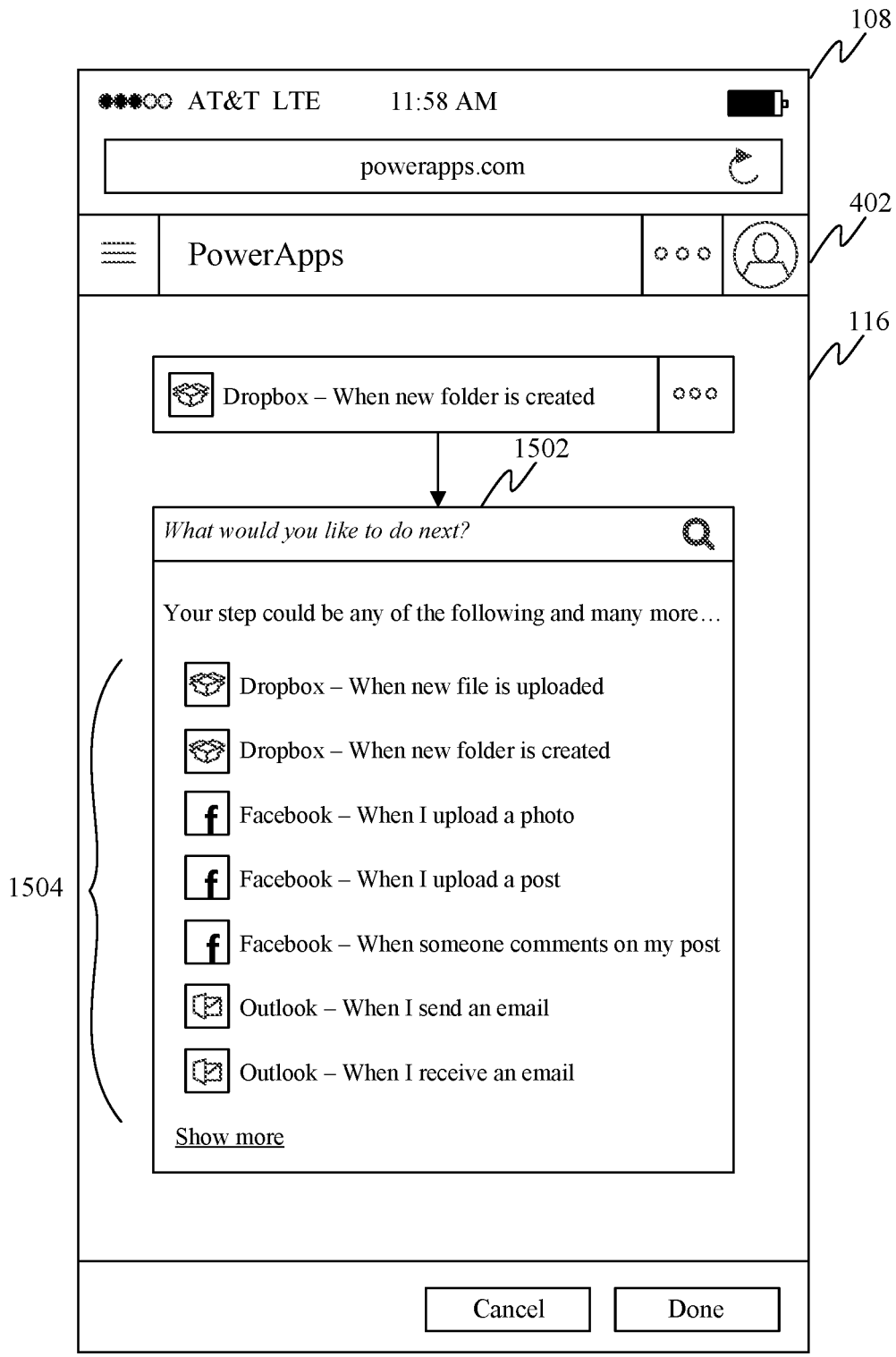

The foregoing technique will now be further illustrated with reference to example workflow designer GUIs of FIGS. 13-15. In particular, FIGS. 13-15 show different views of workflow designer GUI 116 displayed within browser window 402 of display screen 108 in an embodiment in which computing device 102 is a mobile computing device, such as a smart phone.

Figure 13:
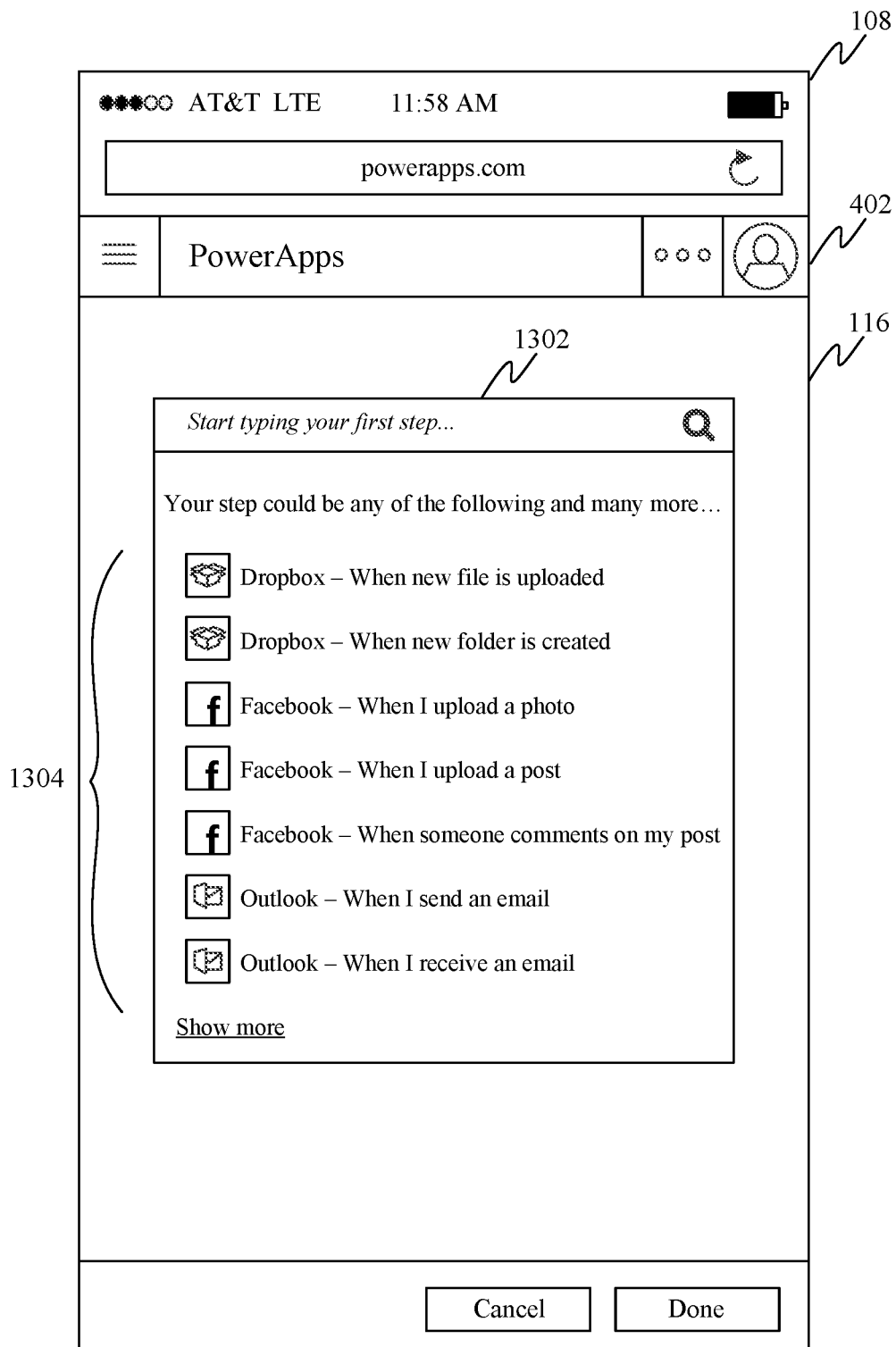
FIGS. 13-15 show views of a workflow designer GUI that provides a developer with access to a search engine for identifying workflow steps for inclusion in a workflow under development.

In FIG. 13, workflow designer GUI 116 comprises a "New flow" screen that enables a developer to build a new workflow without starting from a template or saved workflow (i.e., from scratch). This screen includes features that enable the developer to generate or identify a trigger step that will initiate the workflow. The trigger step may be thought of as a workflow step that monitors for the occurrence of a particular event and, when it determines that the particular event has occurred, triggers the execution of subsequent steps of the workflow.

As further shown in FIG. 13, workflow designer GUI 116 includes a menu 1304 of selectable trigger steps such as "Dropbox—When new file is uploaded," "Dropbox—When new folder is created," "Facebook—When I upload a photo," "Facebook—When I upload a post," "Facebook—When someone comments on my post," "Outlook—When I send an email" and "Outlook—When I receive an email." A developer may interact with (point and click with a mouse, touch via a touch screen, etc.) any of these example trigger steps to select it as the initial step in the workflow.

Alternatively, the developer may type text into a data entry element 1302 (in this case, a text box) that appears in workflow designer GUI 116 and includes the text "Start typing your first step . . . ". The text that is input by the developer is provided as a query to search engine 1102 and used to find workflow steps that can be included in the workflow currently being developed. In this case, since only a trigger step is needed to start the automated workflow, search engine 1102 may only search for workflow steps that qualify as trigger steps. For subsequent steps of the workflow, a broader set of operations may be searched.

FIG. 14 shows workflow designer GUI 116 after a developer has entered the text "new file" into data entry element 1302. This text is provided as a query to search engine 1102. Based on the query, search engine 1102 selects a set of workflow steps (in this case, trigger steps) that are relevant to the query. Search engine 1102 returns identifiers of the selected workflow steps (in this case, icons and names) and such identifiers are displayed in a menu 1404. As shown in FIG. 14, the selected steps include "Box—When a file is created," "Dropbox—When a file is created," "OneDrive—When a file is crated," "OneDrive for Business—When a file is created," and "SharePoint Online—When a file is created." A developer may interact with any of these example trigger steps to select it as the initial step in the workflow.

Once the developer has provided the information for the trigger step, the developer can then initiate the addition of a second step to the workflow. This feature is illustrated by FIG. 15. In particular, as shown in FIG. 15, after the developer has added the trigger step, the developer can add another step (e.g., an action or condition). It will be assumed for the sake of this example that the developer selected an action as the second step of the workflow. When the developer selects an action as the next step, the developer is presented with a menu 1504 of selectable trigger and action steps, as well as a data entry element 1502 that includes the text "What would you like to do next?" The developer may type text into data entry element 1502 and such text will be provided as a query to search engine 1102 and used to find workflow steps that can follow the trigger step in the workflow currently being developed. In this way, the developer may be presented with access to the search engine functionality each time the developer wants to add a new step to the workflow. Such functionality is advantageously presented within the same workflow designer GUI 116 used to display the workflow under development, which means that the developer need not navigate away from the workflow under development to perform the search.

Although in FIGS. 13-15, a text box is shown as being the means for providing input to search engine 1102, in an alternate embodiment, the input can be provided by speaking into a microphone. Such voice-based input may then be submitted to an entity executing on server 134 (or on a computing device that is communicatively connected thereto) that converts the voice-based input to text. The text returned by this entity may then be submitted to search engine 1102. In this way, voice-based natural language searching may be achieved.

As was discussed above, search engine 1102 operates by analyzing metadata associated with various workflow steps stored in workflow library 118 to identify workflow steps that are relevant to a developer query. In one embodiment, the metadata associated with a particular workflow step may be input by another developer. For example, workflow development system 100 may provide a GUI via which a developer can input metadata that is to be associated with one or more operations. In one particular embodiment, the developer provides the metadata at the time the developer registers an API for use with one or more workflows, as part of the API registration process. The API may be, for example and without limitation, an API for an online service that can be utilized or referenced by a step in an automated workflow.

In another embodiment, the metadata associated with a particular workflow step may be provided by multiple developers. For example, workflow development system 100 may provide a GUI by which multiple developers can voluntarily "tag" (e.g., provide descriptive terms for) the various workflow steps that can be included in a workflow. This enables a "crowd-sourcing" approach to generating the metadata that can then be used to facilitate the search functionality.

In a further embodiment, the techniques described above for identifying relevant workflow steps can be adapted such that they can be used by a developer to find workflow templates or saved workflows. For example, text or other user input provided by a developer via workflow designer GUI 116 can be provided as a query to a search engine. The search engine may analyze metadata associated with workflow templates or saved workflows to select workflow templates or saved workflows that are relevant to the query. Access to the selected workflow templates or saved workflows may then be provided to the developer, e.g., via the same workflow designer GUI 116.

D. Example Embodiments for Automatic Generation of Names and Graphical Representations of Workflows In accordance with certain embodiments, workflow development system 100 is configured to automatically generate a name and/or graphical representation (e.g., an icon) for a workflow. The name and/or graphical representation may be generated, for example, based on steps included in the workflow and/or on one or more services that are referenced by the workflow. This feature advantageously enables a developer to assign a recognizable and meaningful name and graphical representation to a workflow without having to devise such name or graphical representation and without having to manually input the name or graphical representation into the system. An embodiment that incorporates this functionality will now be described.

Figure 16:
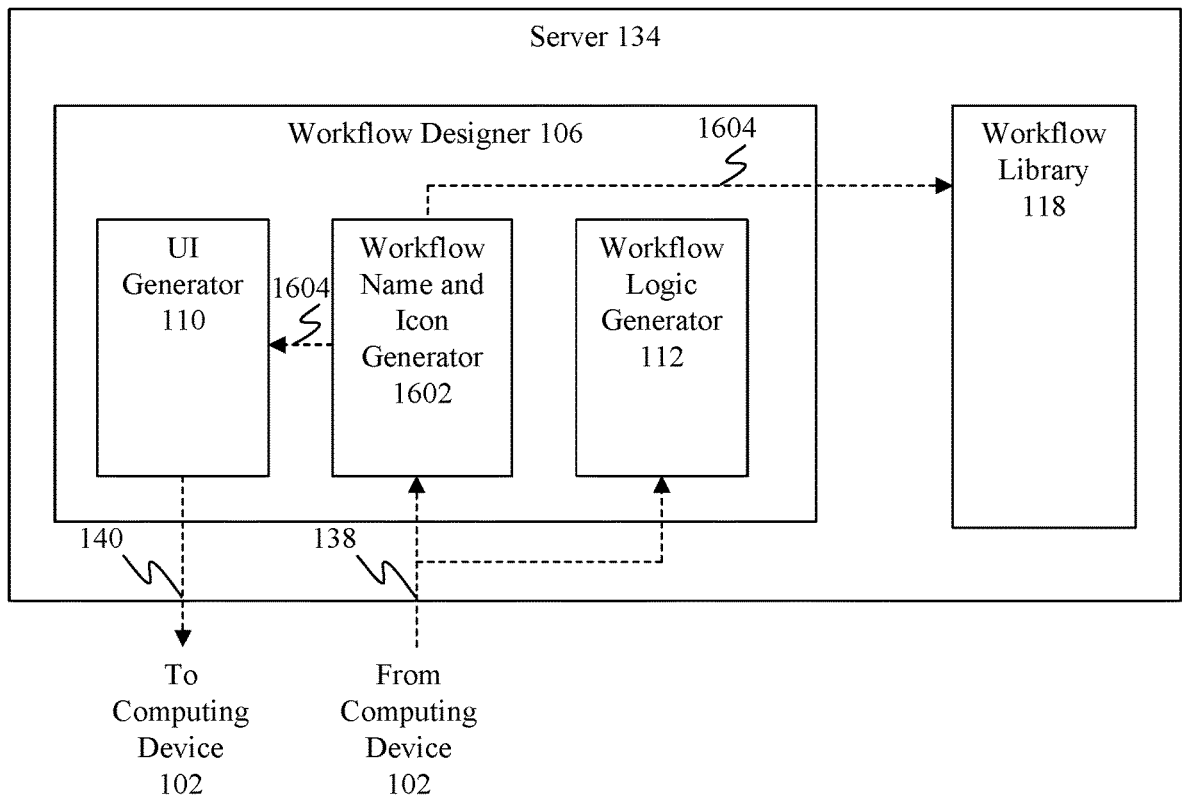
FIG. 16 is a block diagram of a workflow designer that incorporates a workflow name and icon generator that is configured to automatically generate a name and a graphical representation for a workflow.

FIG. 16 is a block diagram of server 134 that includes workflow designer 106 and workflow library 118 (as previously discussed above in reference to FIG. 1). As shown in FIG. 16, workflow designer 106 includes UI generator 110, workflow logic generator 112 and a workflow name and icon generator 1602. As will be discussed below in reference to FIG. 17, workflow name and icon generator 1602 is configured to automatically generate a name and graphical representation for a workflow.

Figure 17:
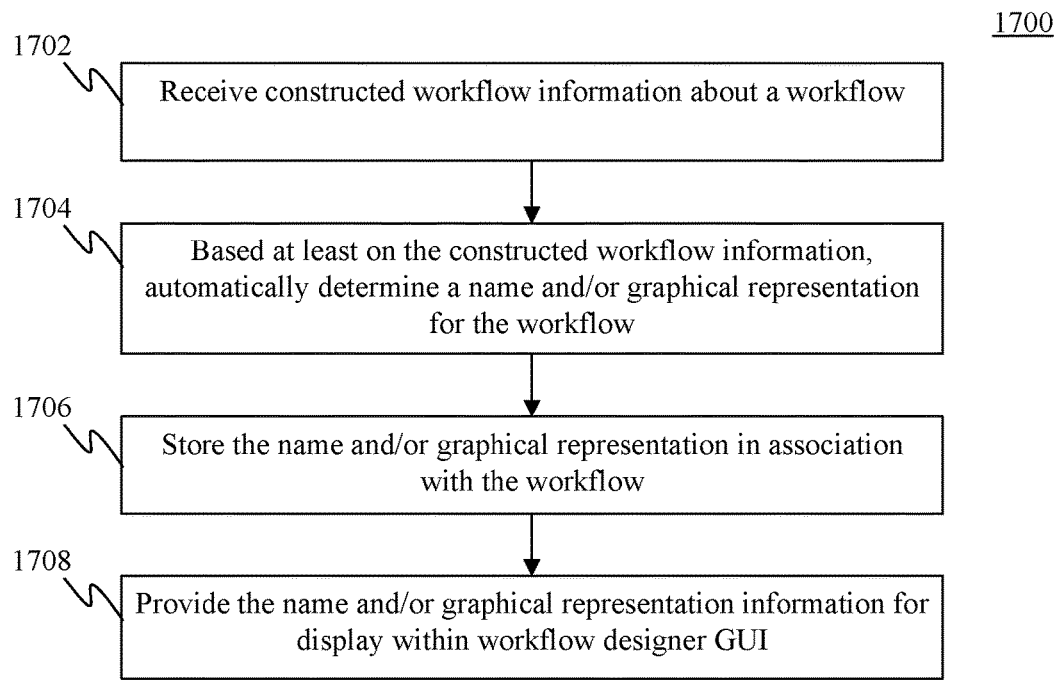
FIG. 17 depicts a flowchart of a method for automatically generating a name and a graphical representation for a workflow.

In particular, FIG. 17 depicts a flowchart 1700 of a method for automatically generating a name and graphical representation for a workflow. As shown in FIG. 17, the method of flowchart 1700 begins at step 1702, in which constructed workflow information about a workflow is received. This step may be performed, for example, by workflow name and icon generator 1602, which (as shown in FIG. 16) receives constructed workflow information 138 from browser 136 executing on computing device 102. As was previously discussed in reference to FIG. 1, constructed workflow information 138 comprises the selected workflow steps, corresponding configuration information, and workflow step sequence information for a workflow currently being developed on computing device 102. Such constructed workflow information 138 is sent to workflow logic generator 112 to facilitate the generation of workflow logic 120 in a manner previously described. In this embodiment, constructed workflow information 138 is also provided to workflow name and icon generator 1602.

At step 1704, a name and/or graphical representation is automatically determined for the workflow based at least on the constructed workflow information. This step may be performed, for example by workflow name and icon generator 1602, which automatically generates a name and/or graphical representation 1604 for the workflow currently being developed on computing device 102 based at least on the constructed workflow information received during step 1702. For example, workflow name and icon generator 1602 may generate name and/or graphical representation 1604 of the workflow currently being developed based on one or more of: one or more steps included in the workflow (and the order thereof), one or more services that are referenced by the workflow (and the order in which such services are referenced), one or more trigger events that are monitored for by the workflow, one or more conditions included in the workflow, one or more actions included in the workflow, or the like. With respect to generating a workflow name, words that describe or relate to these aspects of the workflow may be combined to generate a suitable name for the workflow. With respect to generating a graphical representation, images that describe or relate to these aspects of the workflow may be combined to generate a suitable graphical representation for the workflow. For example, in one embodiment, a graphical representation for a workflow may be generated by combining icons associated with one or more steps included in the workflow and/or services referenced or interacted with by the workflow.

At step 1706, the name and/or graphical representation that was generated for the workflow is stored in association with the workflow. This step may be performed, for example, by workflow name and icon generator 1602 which may store name and/or graphical representation 1604 that was generated for a workflow in association with that workflow in workflow library 118.

At step 1708, the name and/or graphical representation that was generated for the workflow is provided for display within a workflow designer GUI. This step may be performed, for example, by workflow name and icon generator 1602 which may provide name and/or graphical representation 1604 to UI generator 110 so that UI generator 110 can pass name and/or graphical representation 1604 to browser 136 as part of workflow GUI information 140. Browser 136 may cause name and/or graphical representation 1604 to be displayed within workflow designer GUI 116 within browser window 114. For example, the automatically-generated name of the workflow may be displayed as a default workflow name within a text box or other data entry element that is used to enter names for workflows, such that a developer can either accept the name or overwrite it with a new one. As another example, the automatically-generated name and graphical representation may be displayed within a menu of saved workflows that a developer may interact within in order to activate, deactivate, edit, delete or perform other operations with respect to one or more of the saved workflows.

The foregoing technique will now be further illustrated with reference to example workflow designer GUIs of FIGS. 18 and 19. In particular, FIGS. 18 and 19 show views of a workflow designer GUI 116 displayed within browser window 402 of display screen 108 in an embodiment in which computing device 102 is a mobile computing device, such as a smart phone.

Figure 18:
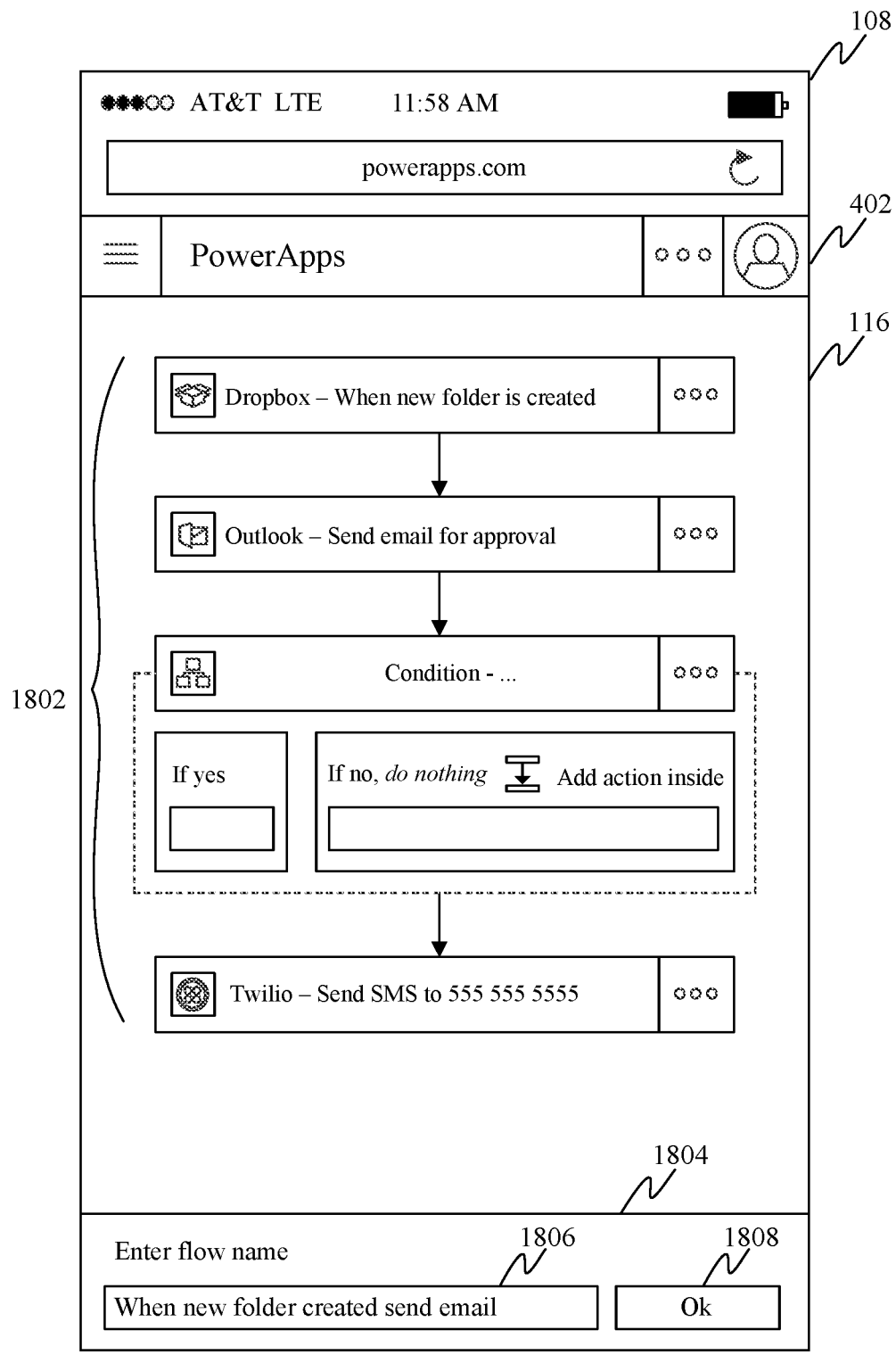
FIGS. 18 and 19 show views of a workflow designer GUI that displays a system-generated name and graphical representation for a workflow.

In FIG. 18, workflow designer GUI 116 displays a workflow 1802 that a developer has recently constructed using techniques that were described previously herein. As shown in FIG. 18, workflow designer GUI 116 also includes a save workflow dialog box 1804. Save workflow dialog box 1804 includes a data entry element 1806 (in this case, a text box) into which a developer may enter a name for the newly-constructed workflow as well as an activation button 1808 (labelled "OK") that will cause the newly-constructed workflow to be saved with the name entered into data entry element 1806.

In an embodiment, UI generator 110 may cause data entry element 1806 to be pre-populated with a system-generated name for workflow 1802, wherein the system-generated name is generated using the method of flowchart 1700 as described above. Thus, as shown in FIG. 18, the system-generated name for workflow 1802 may be "When new folder is created send email." However, this is merely an example, and a variety of system-generated names may be generated for workflow 1802 depending upon the implementation. In an embodiment, the developer can accept the system-generated name by interacting with activation button 1808 to save the workflow with the system-generated name, or may decide to alter the name. In the latter case, the developer may interact with data entry element 1806 to modify or overwrite the system-generated name before saving the workflow.

Figure 19:
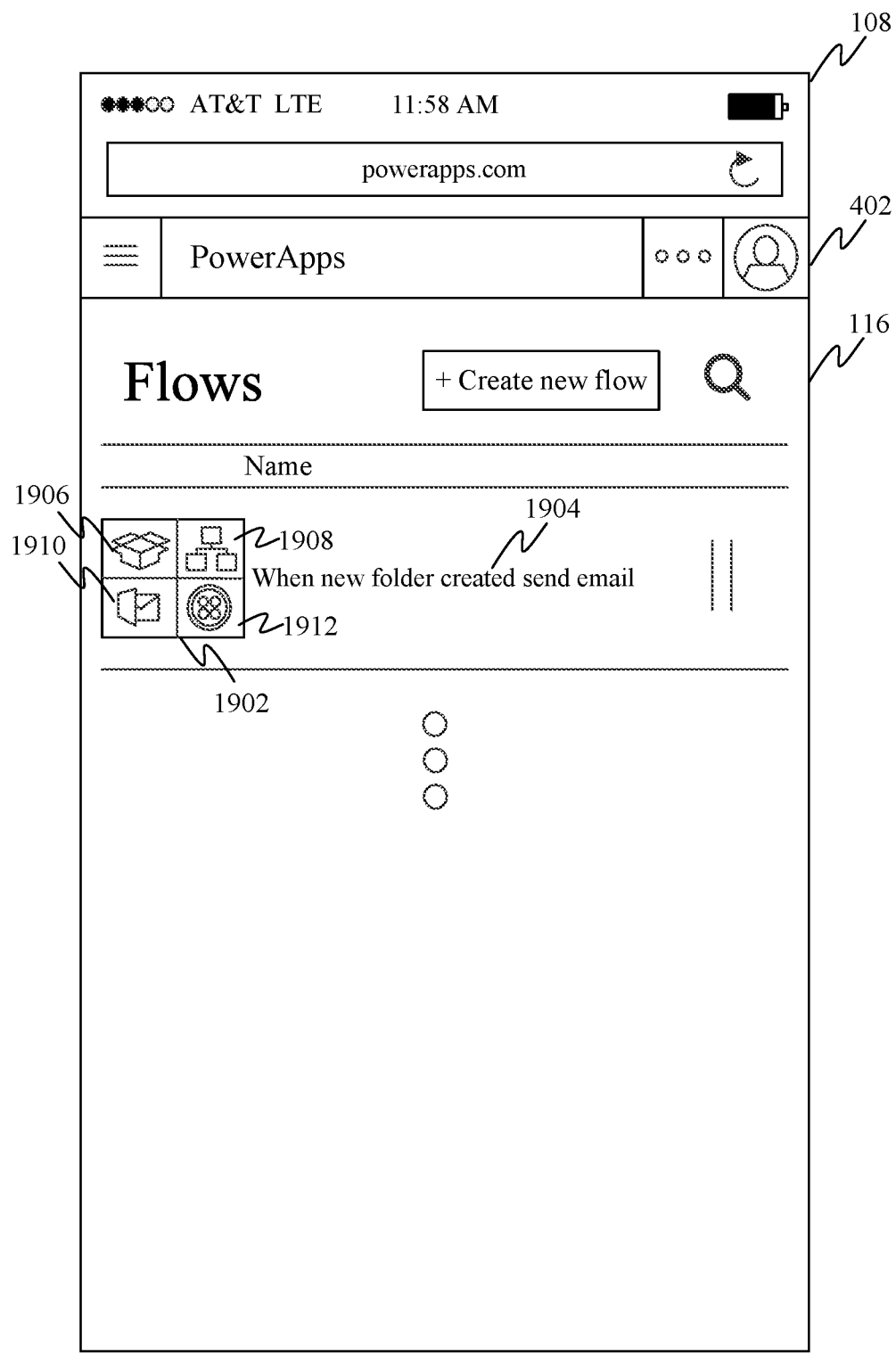

In FIG. 19, workflow designer GUI 116 displays a menu of saved workflows that a developer may interact within in order to activate, deactivate, edit, delete or perform other operations with respect to one or more of the saved workflows. As shown in FIG. 19, workflow 1802 may be represented by an icon 1902 and a name 1904, both of which may be automatically generated using the method of flowchart 1700 as described above. As further shown in FIG. 19, workflow name and icon generator 1602 may automatically generate an icon for a workflow by combining icons associated with one or more steps included in the workflow and/or services referenced or interacted with by the workflow. Thus, for example, automatically-generated icon 1902 of FIG. 19 is a combination of an icon 1906 associated with DropBox™, an icon 1910 associated with Microsoft® Outlook®, and an icon 1912 associated with Twilio®. Each of these are services referenced by workflow 1802 and thus have been combined into representative icon 1902. Furthermore, an icon 1908 has been incorporated into icon 1902 that represents the condition step within workflow 1802. However, this is only an example, and a wide variety of techniques may be used to automatically generate an icon or other graphical representation of a workflow.

E. Example Embodiments for Easily Specifying Input Parameter Values for a Workflow Step of a Workflow Under Development As was previously described, workflow designer 106 generates workflow designer GUI 116 that enables a developer to configure a workflow step within a workflow under development, wherein such configuration includes specifying a value of an input parameter for the workflow step. In an embodiment that will now be described, workflow designer GUI 116 enables a developer to easily specify a value of an input parameter of a second workflow step to include a value of an output parameter of a first workflow step in the same workflow.

In particular, in accordance with an embodiment, workflow designer GUI 116 represents output parameters of a first workflow step of a workflow under development as user-interactive objects. These objects can be easily interacted with (e.g., clicked on or dragged and dropped) by a developer to cause the objects to be inserted into a data entry element (e.g. a text box) that is used to specify a value for an input parameter of a second workflow step of the workflow under development. When executable logic representing the first and second workflow steps is generated, the aforementioned insertion of the objects into the data entry element has the effect of causing the value of the input parameter of the second workflow step to be defined to include the values of the output parameters that correspond to the inserted objects.

This functionality will now be described in reference to FIG. 20, which depicts a flowchart 2000 of a method for defining a value of an input parameter of a second workflow step based on user interaction with one or more user-interactive objects that respectively represent one or more output parameters of a first workflow step within a workflow designer GUI, in accordance with an embodiment. The method of flowchart 2000 may be performed, for example by workflow designer 106 (or various components thereof) as previously described. For the sake of illustration, the description of flowchart 2000 will also reference FIGS. 21-23, each of which shows a different view of workflow designer GUI 116 displayed within browser window 402 of display screen 108 in an embodiment in which computing device 102 is a mobile computing device, such as a smart phone.

Figure 20:
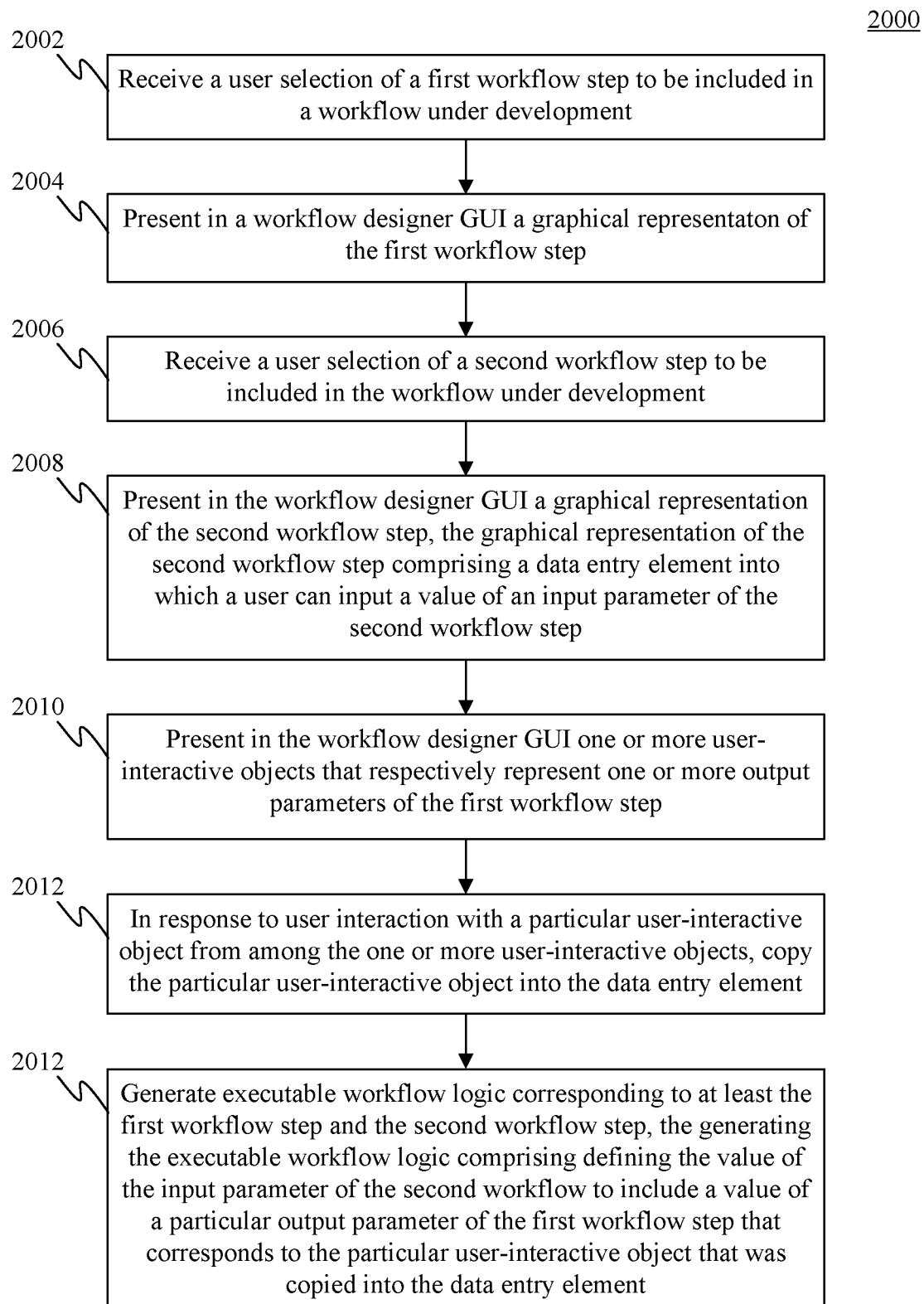
FIG. 20 depicts a flowchart of a method for defining a value of an input parameter of a second workflow step based on user interaction with one or more user-interactive objects that respectively represent one or more output parameters of a first workflow step within a workflow designer GUI, in accordance with an embodiment.

As shown in FIG. 20, the method of flowchart 2000 begins at step 2002, in which a user selection of a first workflow step to be included in a workflow under development is received. For example, workflow designer 106 may receive user input that indicates that a developer has selected a first workflow step "Dropbox—When a file is created." Such input may be received via a step selection tool that is displayed within a workflow designer GUI, as was previously described, or in some other manner.

Figure 21:
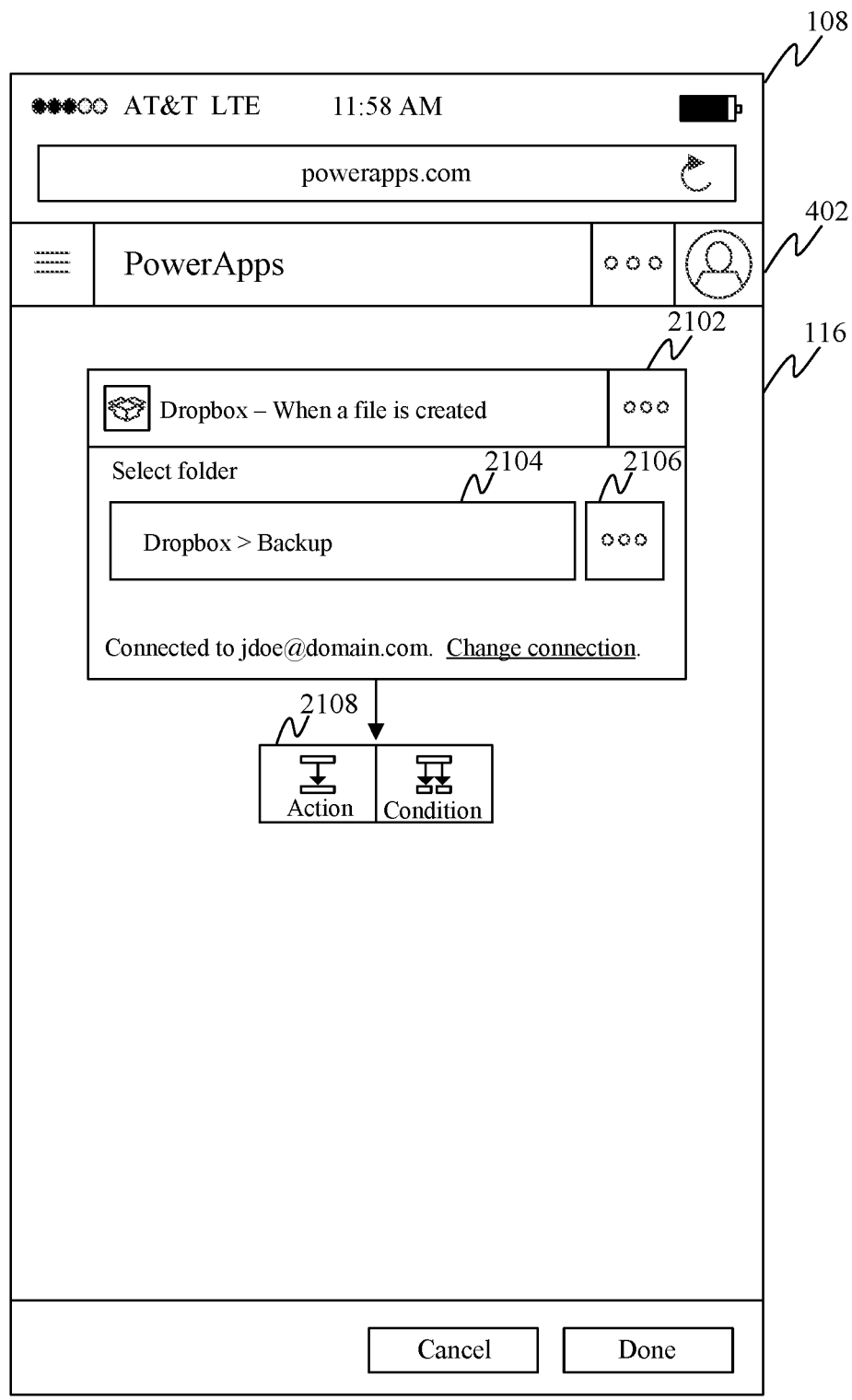
FIGS. 21-23 shows views of a workflow designer GUI that enables an input parameter of a second workflow step to be defined based on user interaction with one or more user-interactive objects that respectively represent one or more output parameters of a first workflow step, in accordance with an embodiment.

At step 2004, a graphical representation of the first workflow step is presented in a workflow designer GUI. For example, as shown in FIG. 21, workflow designer 106 may cause a graphical representation 2102 of the first workflow step "Dropbox—When a file is created" to be rendered within workflow designer GUI 116. In this example, "Dropbox—When a file is created" comprises a trigger step that monitors to determine when a file has been created in a particular Dropbox® folder. As further shown in FIG. 21, workflow designer GUI 116 includes a data entry element 2104 (in this case, a text box) and a file browser activator 2106, each of which can be used by the developer to specify or select an input parameter for this step. In particular, these mechanisms enable the developer to specify or select the name of the Dropbox® folder to be monitored for the file creation. In this example, the developer has specified the folder "Dropbox>Backup."

At step 2006, a user selection of a second workflow step to be included in the workflow under development is received. For example, workflow designer 106 may receive user input that indicates that the developer has selected a second workflow step "Outlook—Send email." Such input may be received via a step selection tool that is displayed within a workflow designer GUI, as was previously described, or in some other manner. With continued reference to FIG. 21, the step selection tool may be displayed when the developer interacts with an action button 2108, indicating that the developer wishes to add an action (as opposed to a condition) as the next step in the workflow under development.

Figure 22:
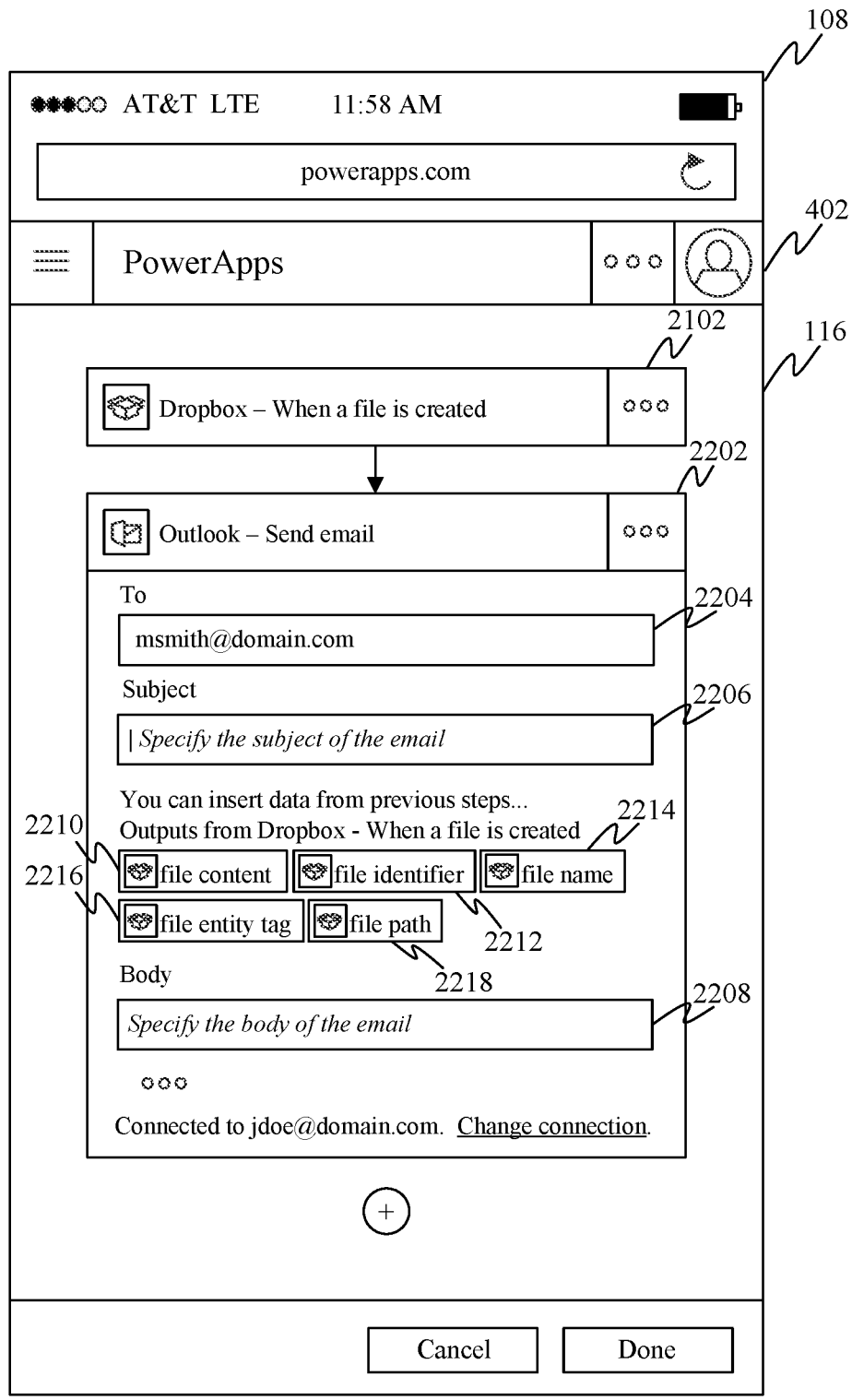

At step 2008, a graphical representation of the second workflow step is presented in the workflow designer GUI. For example, as shown in FIG. 22, workflow designer 106 may cause a graphical representation 2202 of the second workflow step "Outlook—Send email" to be rendered within workflow designer GUI 116. In this example, "Outlook—Send email" comprises an action step that is carried out when a trigger event is detected by trigger step "Dropbox—When file is created."

In further accordance with step 2008, the graphical representation of the second workflow step comprises a data entry element into which a user can input a value of an input parameter of the second workflow step. This is further illustrated in FIG. 22, in which graphical representation 2202 of second workflow step "Outlook—Send email" includes a first data entry element 2204, a second data entry element 2206, and a third data entry element 2208. The developer may interact with each of these data entry elements to specify a value of a corresponding input parameter of the second workflow step. In particular, the developer may interact with first data entry element 2204 to specify an intended recipient of an email to be sent by the second workflow step, with second data entry element 2206 to specify a subject line for the email, and with third data entry element 2208 to specify text to be included in the body of the email. In this particular example, the developer has specified (e.g., by typing text into data entry element 2204) that the value of the e-mail recipient input parameter is "msmith@domain.com".

In step 2010, one or more user-interactive objects are presented in the workflow designer GUI that respectively represent one or more output parameters of the first workflow step. For example, as shown in FIG. 22, workflow designer 106 causes a user-interactive object 2210, a user-interactive object 2212, a user-interactive object 2214, a user-interactive object 2216 and a user-interactive object 2218 to be presented within graphical representation 2202 of the workflow step "Outlook—Send email" displayed within workflow designer GUI 116. Each of these user-interactive objects respectively represent a corresponding output parameter of the first workflow step "Dropbox—When a file is created." In particular, user-interactive object 2210 represents a file content output parameter of the first workflow step, user-interactive object 2212 represents a file identifier output parameter of the first workflow step, user-interactive object 2214 represents a file name output parameter of the first workflow step, user-interactive object 2216 represents a file entity tag output parameter of the first workflow step, and user-interactive object 2218 represents a file path output parameter of the first workflow step.

In the example shown in FIG. 22, the developer may interact with each of user-interactive objects 2210, 2212, 2214, 2216, 2218 to cause the corresponding user-interactive object to be copied into second data entry element 2206. For example, depending upon the implementation, the developer may simply click on a user-interactive object using a mouse, touch a user-interactive object via a touch screen, or the like. As another example, the developer may drag and drop a particular user-interactive object into second data entry element 2206. Still other forms of user-interaction may be performed that will cause a user-interactive object to be copied into second data entry element 2206.

Figure 23:
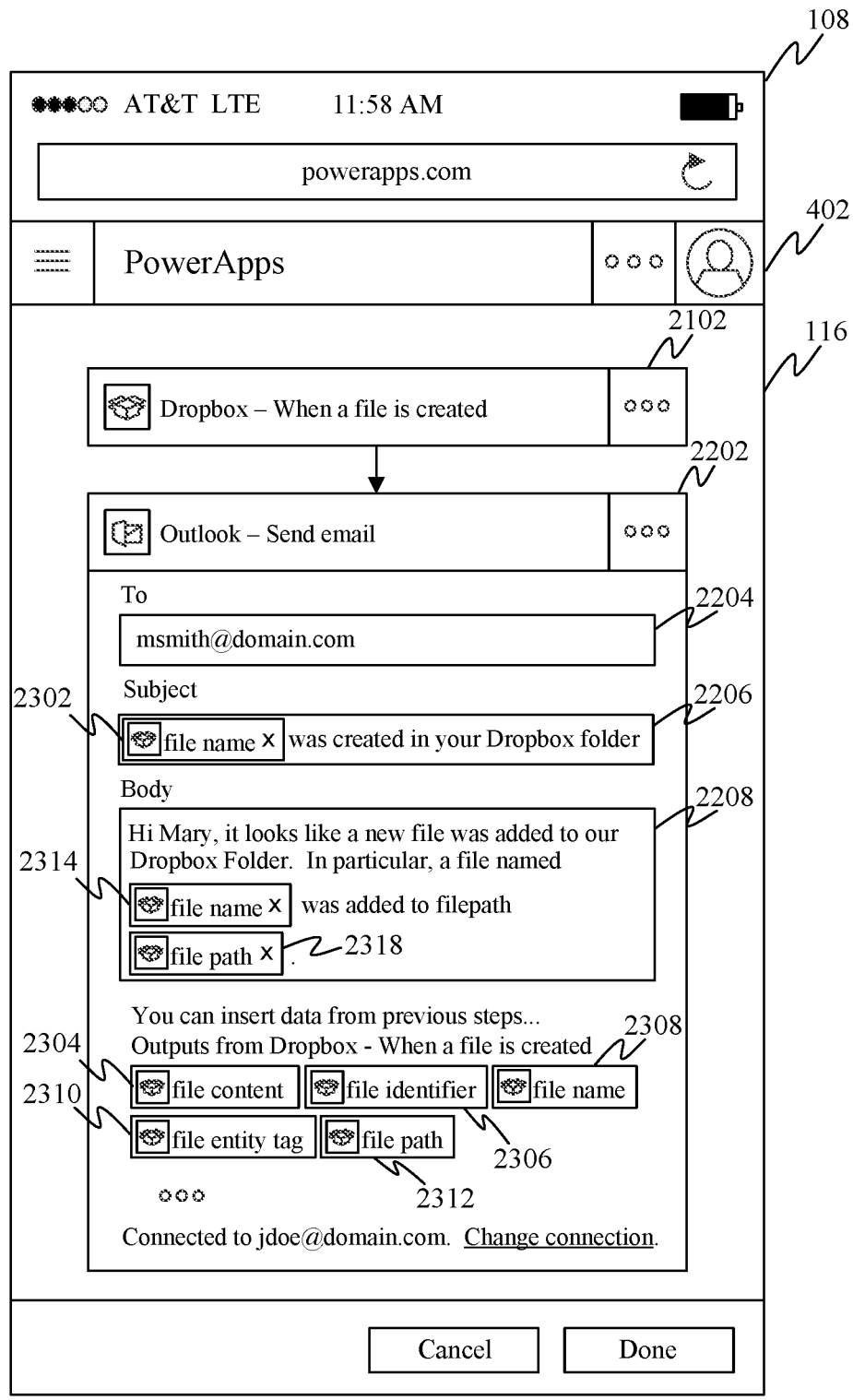

This functionality is represented in step 2012 of flowchart 2000. In particular, at step 2012, in response to user interaction with a particular user-interactive object from among the one or more user-interactive objects, the particular user-interactive object is copied into the data entry element. Thus, for example, as shown in FIG. 23, in response to the developer interacting with user-interactive object 2214 in FIG. 22 ("file name"), a user-interactive object 2302 which is a copy of user-interactive object 2214 has been included in data entry element 2206. In further accordance with this example, the developer also input some text ("was created in your Dropbox folder") into data entry element 2206, following user-interactive object 2302.

The effect of the copying of user-interactive object 2214 into data entry element 2206 is that, at runtime, the "subject" input parameter of the second workflow step "Outlook—Send email" will be defined to include the current value of the "file name" output parameter of the first workflow step "Dropbox—When a file is created."

For example, assume that at runtime, a file named "sales_report_0516" is created in Dropbox® folder "Dropbox>Box", thereby triggering the trigger step "Dropbox—When a file is created". In this case, since the "subject" input parameter of the second workflow step "Outlook—Send email" has been defined to include the current value of the "file name" output parameter of the first workflow step "Dropbox—When a file is created", the subject of the email created by the second workflow step will be "sales_report_0516 was created in your Dropbox folder."

This functionality is achieved by workflow designer 106 in accordance with step 2012 of flowchart 2000. In step 2012, executable workflow logic is generated corresponding to at least the first workflow step and the second workflow step, wherein the generating the executable workflow logic comprises defining the value of the input parameter of the second workflow to include a value of a particular output parameter of the first workflow step that corresponds to the particular user-interactive object that was copied into the data entry element. Thus, in further accordance with the foregoing example, workflow designer 106 generates executable workflow logic (e.g., via workflow logic generator 112 as previously described) that corresponds to at least the first workflow step "Dropbox—When a file is created" and the second workflow step "Outlook—Send email", wherein generating such logic includes defining the value of the "subject" input parameter of the second workflow step "Outlook—Send email" to include the value of the "file name" output parameter of the first workflow step "Dropbox—When a file is created" that corresponds to user-interactive object 2214 that was copied into data entry element 2206.

FIG. 23 further illustrates how user-interactive objects 2304, 2306, 2308, 2310 and 2312, each of which represents an output parameter of first workflow step "Dropbox—When a file is created", can be easily interacted with by a developer to insert such output parameters into the input parameter "Body" of second workflow step "Outlook—Send email." In particular, it can be seen that the developer has interacted with user-interactive object 2308 ("file name") and user-interactive object 2312 ("file path"), thereby causing a copy thereof (user-interactive object 2314 and user-interactive object 2316, respectively) to be inserted into data entry element 2208. At runtime, this will have the effect of including the current values of the output parameters "file name" and "file path" of first workflow step "Dropbox—When a file is created" in the value of the input parameter "Body" of second workflow step "Outlook—Send email."

It is noted that in the foregoing description of flowchart 2000, the graphical representations of the first and second workflow steps are presented in the workflow designer GUI in response to a developer's selection of each of those steps. However, such graphical representations may be presented in response to other developer actions as well. For example, as explained elsewhere herein, graphical representations of workflow steps may also be presented within the workflow designer GUI in response to a developer selecting or loading a particular workflow template or saved workflow for editing and configuration.

III. Example Mobile Device Implementation

Figure 24:
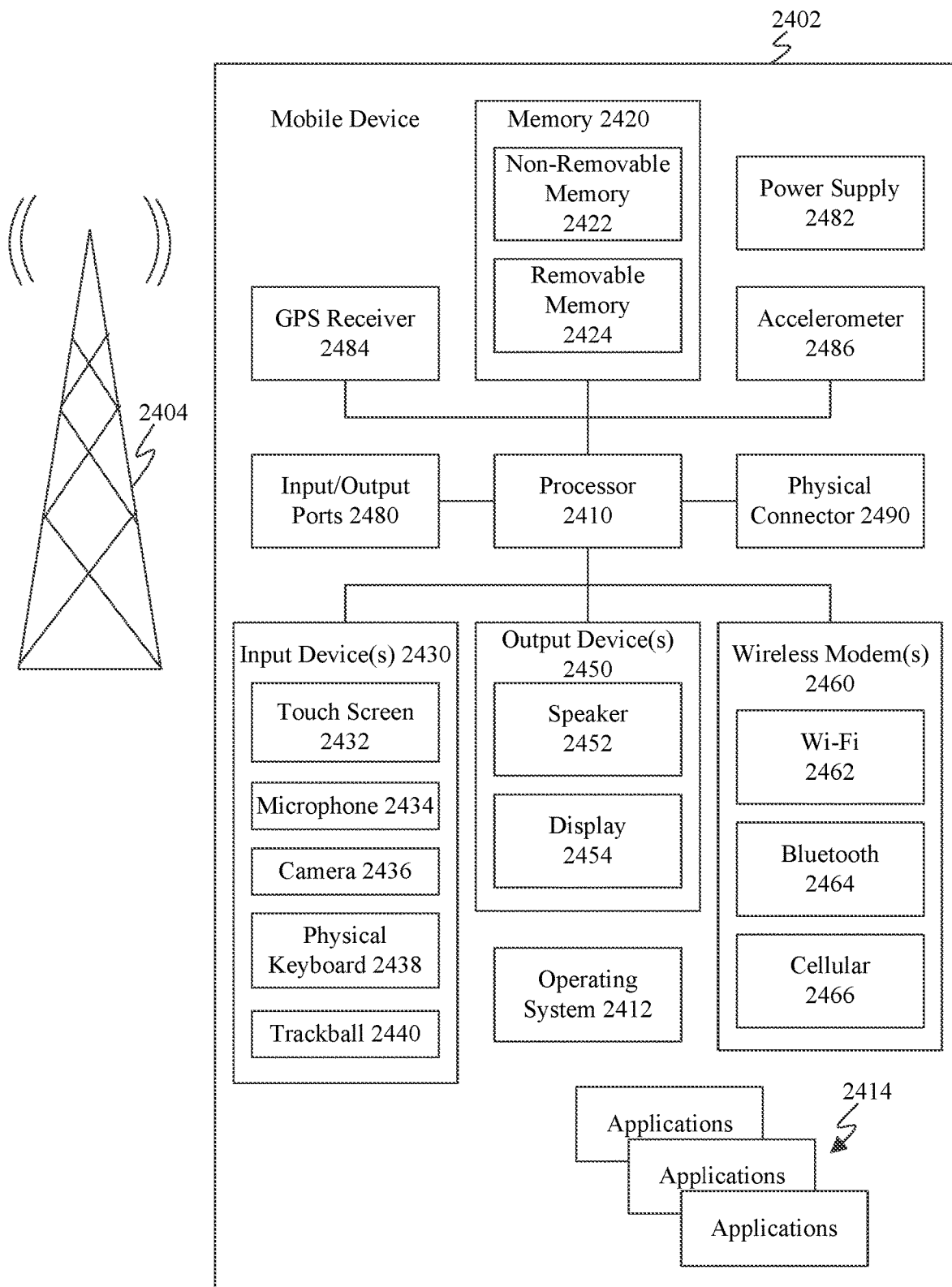
FIG. 24 is a block diagram of an example mobile device that may be used to implement various embodiments.

FIG. 24 is a block diagram of an exemplary mobile device 2402 that may implement embodiments described herein. For example, mobile device 2402 may be used to implement computing device 102 of FIG. 1 or computing device 902 of FIG. 9. As shown in FIG. 24, mobile device 2402 includes a variety of optional hardware and software components. Any component in mobile device 2402 can communicate with any other component, although not all connections are shown for ease of illustration. Mobile device 2402 can be any of a variety of computing devices (e.g., cell phone, smart phone, handheld computer, Personal Digital Assistant (PDA), etc.) and can allow wireless two-way communications with one or more mobile communications networks 2404, such as a cellular or satellite network, or with a local area or wide area network.

Mobile device 2402 can include a controller or processor 2410 (e.g., signal processor, microprocessor, ASIC, or other control and processing logic circuitry) for performing such tasks as signal coding, data processing, input/output processing, power control, and/or other functions. An operating system 2412 can control the allocation and usage of the components of mobile device 2402 and provide support for one or more application programs 2414 (also referred to as "applications" or "apps"). Application programs 2414 may include common mobile computing applications (e.g., e-mail applications, calendars, contact managers, web browsers, messaging applications) and any other computing applications (e.g., word processing applications, mapping applications, media player applications).

Mobile device 2402 can include memory 2420. Memory 2420 can include non-removable memory 2422 and/or removable memory 2424. Non-removable memory 2422 can include RAM, ROM, flash memory, a hard disk, or other well-known memory devices or technologies. Removable memory 2424 can include flash memory or a Subscriber Identity Module (SIM) card, which is well known in GSM communication systems, or other well-known memory devices or technologies, such as "smart cards." Memory 2420 can be used for storing data and/or code for running operating system 2412 and application programs 2414. Example data can include web pages, text, images, sound files, video data, or other data to be sent to and/or received from one or more network servers or other devices via one or more wired or wireless networks. Memory 2420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 2402 can support one or more input devices 2430, such as a touch screen 2432, a microphone 2434, a camera 2436, a physical keyboard 2438 and/or a trackball 2440 and one or more output devices 2450, such as a speaker 2452 and a display 2454. Other possible output devices (not shown) can include piezoelectric or other haptic output devices. Some devices can serve more than one input/output function. For example, touch screen 2432 and display 2454 can be combined in a single input/output device. Input devices 2430 can include a Natural User Interface (NUI).

Wireless modem(s) 2460 can be coupled to antenna(s) (not shown) and can support two-way communications between processor 2410 and external devices, as is well understood in the art. Modem(s) 2460 are shown generically and can include a cellular modem 2466 for communicating with the mobile communication network 2404 and/or other radio-based modems (e.g., Bluetooth 2464 and/or Wi-Fi 2462). At least one of wireless modem(s) 2460 is typically configured for communication with one or more cellular networks, such as a GSM network for data and voice communications within a single cellular network, between cellular networks, or between the mobile device and a public switched telephone network (PSTN).

Mobile device 2402 can further include at least one input/output port 2480, a power supply 2482, a satellite navigation system receiver 2484, such as a Global Positioning System (GPS) receiver, an accelerometer 2486, and/or a physical connector 2490, which can be a USB port, IEEE 1394 (FireWire) port, and/or RS-232 port. The illustrated components of mobile device 2402 are not required or all-inclusive, as any components can be deleted and other components can be added as would be recognized by one skilled in the art.

In an embodiment, mobile device 2402 is configured to implement any of the above-described features of workflow development system 100. Computer program logic for performing the functions of these devices may be stored in memory 2420 and executed by processor 2410.

IV. Example Computer System Implementation

Figure 25:
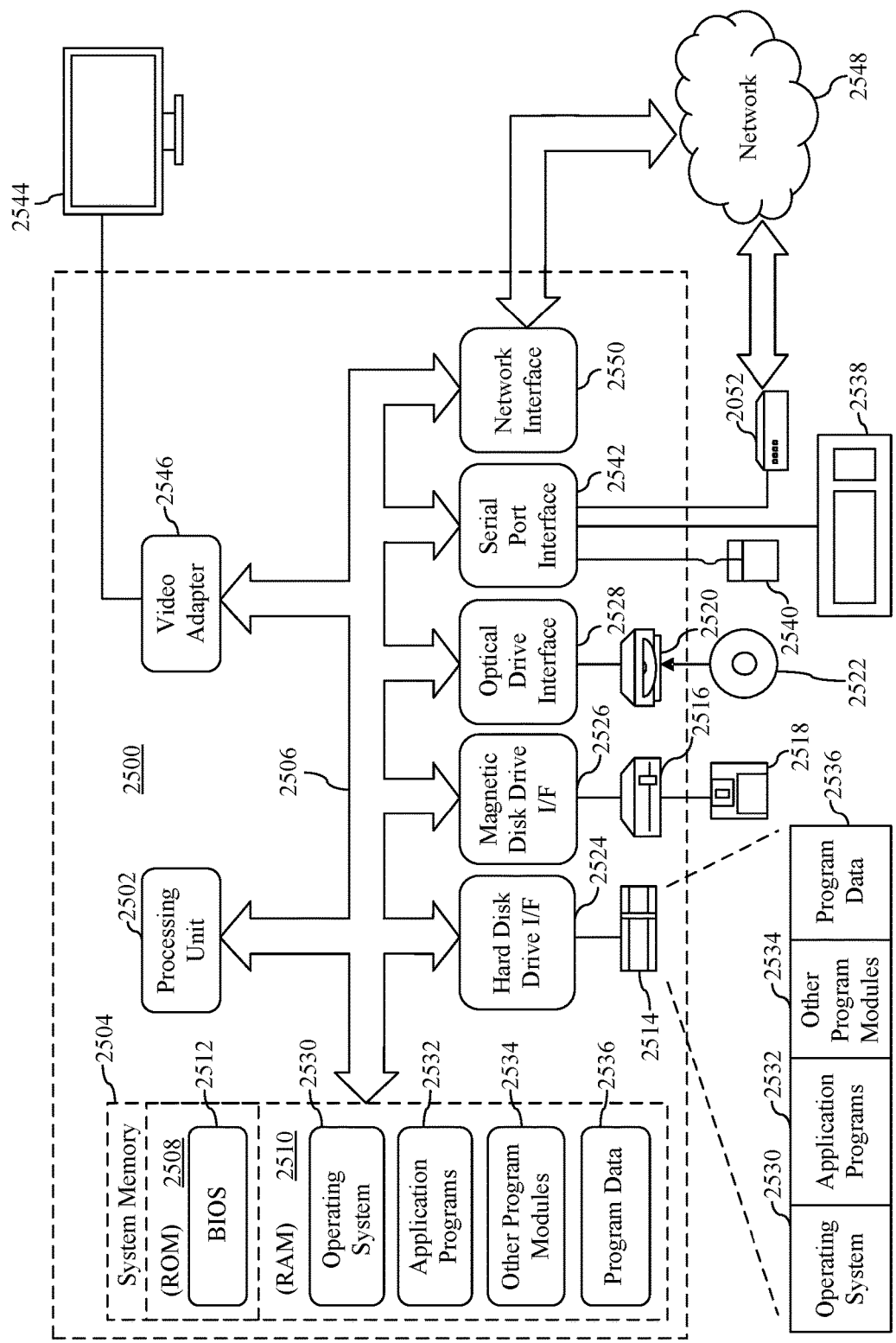
FIG. 25 is a block diagram of an example processor-based computer system that may be used to implement various embodiments.

FIG. 25 depicts an example processor-based computer system 2500 that may be used to implement various embodiments described herein. For example, system 2500 may be used to implement computing device 102 or server 134 as described above in reference to FIG. 1, or computing device 902 as described above in reference to FIG. 9. System 2500 may also be used to implement any of the steps of any of the flowcharts of FIGS. 2, 10, 12, 17 and 20 as described above. The description of system 2500 provided herein is provided for purposes of illustration, and is not intended to be limiting. Embodiments may be implemented in further types of computer systems, as would be known to persons skilled in the relevant art(s).

As shown in FIG. 25, system 2500 includes a processing unit 2502, a system memory 2504, and a bus 2506 that couples various system components including system memory 2504 to processing unit 2502. Processing unit 2502 may comprise one or more circuits, microprocessors or microprocessor cores. Bus 2506 represents one or more of any of several types of bus structures, including a memory bus or memory controller, a peripheral bus, an accelerated graphics port, and a processor or local bus using any of a variety of bus architectures. System memory 2504 includes read only memory (ROM) 2508 and random access memory (RAM) 2510. A basic input/output system 2512 (BIOS) is stored in ROM 2508.

System 2500 also has one or more of the following drives: a hard disk drive 2514 for reading from and writing to a hard disk, a magnetic disk drive 2516 for reading from or writing to a removable magnetic disk 2518, and an optical disk drive 2520 for reading from or writing to a removable optical disk 2522 such as a CD ROM, DVD ROM, BLU-RAY™ disk or other optical media. Hard disk drive 2514, magnetic disk drive 2516, and optical disk drive 2520 are connected to bus 2506 by a hard disk drive interface 2524, a magnetic disk drive interface 2526, and an optical drive interface 2528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 2530, one or more application programs 2532, other program modules 2534, and program data 2536. In accordance with various embodiments, the program modules may include computer program logic that is executable by processing unit 2502 to perform any or all of the functions and features of computing device 102 or server 134 as described above in reference to FIG. 1, or computing device 902 as described above in reference to FIG. 9. The program modules may also include computer program logic that, when executed by processing unit 2502, causes processing unit 2502 to perform any of the steps of any of the flowcharts of FIGS. 2, 10, 12, 17 and 20 as described above.

A user may enter commands and information into system 2500 through input devices such as a keyboard 2538 and a pointing device 2540 (e.g., a mouse). Other input devices (not shown) may include a microphone, joystick, game controller, scanner, or the like. In one embodiment, a touch screen is provided in conjunction with a display 2544 to allow a user to provide user input via the application of a touch (as by a finger or stylus for example) to one or more points on the touch screen. These and other input devices are often connected to processing unit 2502 through a serial port interface 2542 that is coupled to bus 2506, but may be connected by other interfaces, such as a parallel port, game port, or a universal serial bus (USB). Such interfaces may be wired or wireless interfaces.

Display 2544 is connected to bus 2506 via an interface, such as a video adapter 2546. In addition to display 2544, system 2500 may include other peripheral output devices (not shown) such as speakers and printers.

System 2500 is connected to a network 2548 (e.g., a local area network or wide area network such as the Internet) through a network interface 2550, a modem 2552, or other suitable means for establishing communications over the network. Modem 2552, which may be internal or external, is connected to bus 2506 via serial port interface 2542.

As used herein, the terms "computer program medium," "computer-readable medium," and "computer-readable storage medium" are used to generally refer to memory devices or storage structures such as the hard disk associated with hard disk drive 2514, removable magnetic disk 2518, removable optical disk 2522, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 2532 and other program modules 2534) may be stored on the hard disk, magnetic disk, optical disk, ROM, or RAM. Such computer programs may also be received via network interface 2550, serial port interface 2542, or any other interface type. Such computer programs, when executed or loaded by an application, enable system 2500 to implement features of embodiments discussed herein. Accordingly, such computer programs represent controllers of the system 2500. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 2500 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Additional Example Embodiments

A system is described herein. The system includes at least one processor circuit and at least one memory that stores program code configured to be executed by the at least one processor circuit. The program code includes a step selector and a search engine. The step selector is configured to present a data entry element within a GUI of a workflow development system that displays a workflow under development, to accept input via the data entry element, and to provide the input as a query to a search engine. The search engine is configured to process the query to select one or more workflow steps from a library of workflow steps and to provide an identifier of each of the one or more workflow steps to the step selector. The step selector is further configured to present each of the identifiers within the GUI and, upon selection of one of the identifiers, to render a representation of the workflow step corresponding to the selected identifier as part of the workflow under development that is displayed in the GUI.

In one embodiment of the foregoing system, the search engine comprises a natural language search engine.

In another embodiment of the foregoing system, the search engine is configured to process the query to select the one or more workflow steps by analyzing workflow step metadata associated with each of the workflow steps.

In yet another embodiment of the foregoing system, the workflow step metadata comprises at least one of: an identifier of a workflow step; a description of a workflow step; an identifier of a service that is utilized or referenced by a workflow step; a description of a service that is utilized or referenced by a workflow step; an identifier of a trigger monitored for by a workflow step; a description of a trigger monitored for by a workflow step; an identifier of an action performed by a workflow step; or a description of an action performed by a workflow step.

In still another embodiment of the foregoing system, the workflow step metadata associated with at least one workflow step is provided by a developer as part of an application programming interface (API) registration process.

In a further embodiment of the foregoing system, the workflow step metadata associated with at least one workflow step is provided by a developer via a GUI that enables developers to tag workflow steps with descriptive terms.

In a still further embodiment of the foregoing system, each of the identifiers comprises one or more of a name and a graphical representation of a workflow step.

In another embodiment of the foregoing system, the step selector is configured to present the data entry element and each of the identifiers concurrently with presenting the workflow under development.

A method in a computing device for automatically generating a name for a workflow under development in a workflow development system is also described herein. The method includes: receiving constructed workflow information about the workflow under development, the constructed workflow information including information about workflow steps, a configuration of each of the workflow steps, and sequence information for the workflow steps; based at least on the constructed workflow information, automatically determining a name for the workflow under development; storing the name in association with the workflow under development; and providing the name for display within a graphical user interface (GUI) of the workflow development system.

In one embodiment of the foregoing method, the name is automatically determined based at on at least one of: one or more steps included in the workflow under development; an order of steps include in the workflow under development; one or more services referenced by the workflow under development; an order in which services are referenced by the workflow under development; one or more trigger events that are monitored for by the workflow under development; one or more conditions included in the workflow under development; or one or more actions included in the workflow under development.

In another embodiment of the foregoing method, providing the name for display within the GUI of the workflow development system comprises prepopulating a data entry box of the GUI of the workflow development system, the data entry box being operable to receive a user-specified name for the workflow under development.

In yet another embodiment of the foregoing method, providing the name for display within the GUI of the workflow development system comprises providing the name within a menu of saved workflows.

In still another embodiment of the foregoing method, the method further comprises: automatically generating a graphical representation for the workflow under development based at least on the constructed workflow information; storing the graphical representation in association with the workflow under development; and providing the graphical representation for display within the GUI of the workflow development system.

In a further embodiment of the foregoing method, the graphical representation is automatically generated by combining icons associated with one or more steps included in the workflow or with one or more services referenced by or interacted with by the workflow.

A computer program product is also described herein. The compute program product comprises a computer-readable memory having computer program logic recorded thereon that when executed by at least one processor causes the at least one processor to perform a method. The method comprises: presenting in a workflow designer GUI a graphical representation of a first workflow step; presenting in the workflow designer GUI a graphical representation of a second workflow step, the graphical representation of the second workflow step comprising a data entry element into which a value of an input parameter of the second workflow step can be input; presenting in the workflow designer GUI one or more user-interactive objects that respectively represent one or more output parameters of the first workflow step; in response to user interaction with a particular user-interactive object among the one or more user-interactive objects, copying the particular user-interactive object into the data entry element; and generating executable workflow logic corresponding to at least the first workflow step and the second workflow step, the generating the executable workflow logic comprising defining the value of the input parameter of the second workflow step to include a value of a particular output parameter of the first workflow step that corresponds to the particular user-interactive object that was copied into the data entry element.

In one embodiment of the foregoing computer program product, at least one of presenting the graphical representation of the first workflow step and presenting the graphical representation of the second workflow step is performed in response to a user selection of a workflow step.

In another embodiment of the foregoing computer program product, at least one of presenting the graphical representation of the first workflow step and presenting the graphical representation of the second workflow step is performed in response to a user selection of a workflow template.

In yet another embodiment of the foregoing computer program product, at least one of presenting the graphical representation of the first workflow step and presenting the graphical representation of the second workflow step is performed in response to a user selection of a saved workflow.

In still another embodiment of the foregoing computer program product, the user interaction with the particular user-interactive object comprises the user clicking on the particular user-interactive object.

In a further embodiment of the foregoing computer program product, the user interaction with the particular user-interactive object comprises the user dragging and dropping the particular user-interactive object onto the data entry element.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   at least one processor circuit; and
   at least one memory that stores program code configured to be executed by the at least one processor circuit, the program code comprising:
   a step selector configured to:
      generate first user interface (UI) information comprising a data entry element for presentation within a graphical user interface (GUI) of a workflow development system that displays a workflow under development;
      accept input via the data entry element after the data entry element is presented within the GUI;
      provide the input as a query to a search engine; and
   the search engine configured to process the query to select one or more workflow steps from a library of workflow steps and to provide an identifier of each of the one or more workflow steps to the step selector;
   the step selector being further configured to:
      generate second UI information that causes the data entry element and each of the identifiers to be presented concurrently with the workflow under development within the GUI, the presented identifiers being interactive and, upon user interaction with one of the identifiers, to
      generate third UI information that enables rendering a representation of the workflow step corresponding to the respective one of the identifiers as part of the workflow under development that is displayed in the GUI.

2. The system of claim 1, wherein the search engine comprises a natural language search engine.

3. The system of claim 1, wherein the search engine is configured to process the query to select the one or more workflow steps by analyzing workflow step metadata associated with each of the workflow steps.

4. The system of claim 3, wherein the workflow step metadata comprises at least one of:
   an identifier of a workflow step;
   a description of a workflow step;
   an identifier of a service that is utilized or referenced by a workflow step;
   a description of a service that is utilized or referenced by a workflow step;
   an identifier of a trigger monitored for by a workflow step;
   a description of a trigger monitored for by a workflow step;
   an identifier of an action performed by a workflow step; or
   a description of an action performed by a workflow step.

5. The system of claim 3, wherein the workflow step metadata associated with at least one workflow step is provided by a developer as part of an application programming interface (API) registration process.

6. The system of claim 3, wherein the workflow step metadata associated with at least one workflow step is provided by a developer via a GUI that enables developers to tag workflow steps with descriptive terms.

7. The system of claim 3, wherein each of the identifiers comprises one or more of a name and a graphical representation of a workflow step.

8. A method, comprising:
   presenting a data entry element within a graphical user interface (GUI) of a workflow development system that displays a workflow under development;
   accepting input via the data entry element;
   providing the input as a query to a search engine that processes the query to select one or more workflow steps from a library of workflow steps;
   receiving an identifier of each of the one or more workflow steps from the search engine;
   presenting the data entry element and each of the identifiers within the GUI concurrently with presenting the workflow under development, the presented identifiers being interactive; and
   upon user interaction with one of the identifiers, rendering a representation of the workflow step corresponding to the respective one of the identifiers as part of the workflow under development that is displayed within the GUI.

9. The method of claim 8, wherein the search engine comprises a natural language search engine.

10. The method of claim 8, wherein the search engine processes the query to select the one or more workflow steps by analyzing workflow step metadata associated with each of the workflow steps.

11. The method of claim 10, wherein the workflow step metadata comprises at least one of:
   an identifier of a workflow step;
   a description of a workflow step;
   an identifier of a service that is utilized or referenced by a workflow step;
   a description of a service that is utilized or referenced by a workflow step;
   an identifier of a trigger monitored for by a workflow step;
   a description of a trigger monitored for by a workflow step;
   an identifier of an action performed by a workflow step; or
   a description of an action performed by a workflow step.

12. The method of claim 10, wherein the workflow step metadata associated with at least one workflow step is provided by a developer as part of an application programming interface (API) registration process.

13. The method of claim 10, wherein the workflow step metadata associated with at least one workflow step is provided by a developer via a GUI that enables developers to tag workflow steps with descriptive terms.

14. The method of claim 10, wherein each of the identifiers comprises one or more of a name and a graphical representation of a workflow step.

15. A computer program product comprising a computer-readable memory having computer program logic recorded thereon that when executed by at least one processor causes the at least one processor to perform a method, the method comprising:
presenting a data entry element within a graphical user interface (GUI) of a workflow development system that displays a workflow under development;
accepting input via the data entry element;
providing the input as a query to a search engine that processes the query to select one or more workflow steps from a library of workflow steps;
receiving an identifier of each of the one or more workflow steps from the search engine;
presenting the data entry element and the identifier of each of the one or more workflow steps within the GUI concurrently with presenting the workflow under development, the identifier of each of the one or more workflow steps being interactive; and
upon user interaction with one of the identifiers, rendering a representation of the workflow step corresponding to the respective one of the identifiers as part of the workflow under development that is displayed within the GUI.

16. The computer program product of claim 15, wherein the search engine processes the query to select the one or more workflow steps by analyzing workflow step metadata associated with each of the workflow steps.

17. The computer program product of claim 16, wherein the workflow step metadata comprises at least one of:
an identifier of a workflow step;
a description of a workflow step;
an identifier of a service that is utilized or referenced by a workflow step;
a description of a service that is utilized or referenced by a workflow step;
an identifier of a trigger monitored for by a workflow step;
a description of a trigger monitored for by a workflow step;
an identifier of an action performed by a workflow step; or
a description of an action performed by a workflow step.

18. The computer program product of claim 16, wherein the workflow step metadata associated with at least one workflow step is provided by a developer as part of an application programming interface (API) registration process.

* * * * *